United States Patent
Sumabat et al.

(10) Patent No.: US 12,522,773 B2
(45) Date of Patent: Jan. 13, 2026

(54) SYSTEM FOR EFFLUENT STREAM ABATEMENT VIA PYROLYTIC EMISSION LOOPING

(71) Applicant: Lyten, Inc., San Jose, CA (US)

(72) Inventors: Joshua Sumabat, San Jose, CA (US); Bryce H. Anzelmo, Parsippany, NJ (US); Joe Cruz, San Jose, CA (US)

(73) Assignee: LYTEN, INC., San Jose, CA (US)

( * ) Notice: Subject to any disclaimer, the term of this patent is extended or adjusted under 35 U.S.C. 154(b) by 0 days.

(21) Appl. No.: 18/198,723

(22) Filed: May 17, 2023

(65) Prior Publication Data

US 2024/0384187 A1 Nov. 21, 2024

(51) Int. Cl.
*C10G 70/00* (2006.01)
*C10G 70/04* (2006.01)

(52) U.S. Cl.
CPC ... *C10G 70/043* (2013.01); *C10G 2300/1033* (2013.01); *C10G 2300/201* (2013.01); *C10G 2300/4062* (2013.01); *C10G 2300/4081* (2013.01)

(58) Field of Classification Search
CPC .......... C10G 70/043; C10G 2300/1033; C10G 2300/201; C10G 2300/4062; C10G 2300/4081
See application file for complete search history.

(56) References Cited

U.S. PATENT DOCUMENTS

| | | | |
|---|---|---|---|
| 4,436,611 A * | 3/1984 | Jaquay | C10G 1/02 201/34 |
| 6,670,058 B2 | 12/2003 | Muradov | |
| 12,359,136 B2 | 7/2025 | Sumabat et al. | |
| 2004/0115492 A1* | 6/2004 | Galloway | H01M 8/0668 429/426 |
| 2005/0191237 A1 | 9/2005 | Selinger et al. | |
| 2007/0289509 A1* | 12/2007 | Vera | C10J 3/18 219/121.48 |
| 2008/0268300 A1* | 10/2008 | Pfefferle | H01M 8/0668 429/443 |

(Continued)

OTHER PUBLICATIONS

Sumabat et al., U.S. Appl. No. 18/198,704, filed May 17, 2023.

(Continued)

*Primary Examiner* — Ellen M McAvoy
*Assistant Examiner* — Chantel Graham
(74) *Attorney, Agent, or Firm* — Zilka-Kotab, P.C.

(57) ABSTRACT

Pyrolytic emissions often include molecularly decomposed hydrocarbons, as well as byproducts from pyrolytic processes. Unfortunately, legacy processing treats effluent streams, including pyrolytic emissions, as waste that is released into the air-even though such pyrolytic emissions streams often include greenhouse gases and pollutants such as carbon dioxide, nitrogen oxides, sulfur dioxide, volatile organic compounds, and particulate matter-the discharge of which contributes to global greenhouse gas emissions. Disclosed herein are pyrolytic emissions looping systems that include several reactors where each of the several reactors converts different hydrocarbons into different useful end-products, thus providing a way to continuously recycle the effluent gas stream from pyrolytic processes.

29 Claims, 14 Drawing Sheets

FULLY STATUTORY-COMPLIANT, NEAR ZERO-EMISSION, AND EFFLUENT STREAM RECYCLING SYSTEM

(56) References Cited

U.S. PATENT DOCUMENTS

| | | | |
|---|---|---|---|
| 2014/0356744 A1* | 12/2014 | McAlister | H01M 8/0618 422/162 |
| 2016/0002549 A1* | 1/2016 | Kim | C10L 3/06 435/167 |
| 2016/0272902 A1* | 9/2016 | Zhang | C10B 19/00 |
| 2024/0383748 A1 | 11/2024 | Sumabat et al. | |
| 2024/0384185 A1 | 11/2024 | Sumabat et al. | |
| 2024/0387846 A1 | 11/2024 | Sumabat et al. | |

OTHER PUBLICATIONS

Sumabat et al., U.S. Appl. No. 18/198,735, filed May 17, 2023.
Sumabat et al., U.S. Appl. No. 18/198,767, filed May 17, 2023.
Final Office Action from U.S. Appl. No. 18/198,767, dated Dec. 29, 2023.
Non-Final Office Action from U.S. Appl. No. 18/198,767, dated Sep. 6, 2023.
Non-Final Office Action from U.S. Appl. No. 18/198,767, dated Aug. 22, 2024.
Final Office Action from U.S. Appl. No. 18/198,767, dated Feb. 5, 2025.
Non-Final Office Action from U.S. Appl. No. 18/198,735, dated Feb. 26, 2025.
Notice of Allowance from U.S. Appl. No. 18/198,735, dated Jun. 12, 2025.

* cited by examiner

900

SYSTEM FOR EFFLUENT STREAM ABATEMENT VIA PYROLYTIC EMISSION LOOPING

FIELD OF THE INVENTION

The present invention relates to abatement systems, and more particularly to abatement of hydrocarbons byproducts and/or toxic air contaminants.

BACKGROUND

Effluent gas streams have consistently been treated as a waste stream from industrial processes. A reason for this is due to the fact that effluent gas streams often include polycyclic aromatic hydrocarbons, toxic air contaminants, and/or other pollutants, including carbon dioxide, nitrogen oxides, sulfur dioxide, particulate matter, volatile organic compounds, etc., all of which can cause potential environmental and health problems. In view of such issues, most companies use a variety of remedial systems to remove pollutants prior to discharge from the industrial plant. For example, scrubbers, filters, catalytic converters, thermal oxidizers, gasification, and/or carbon capture/storage are all used in a variety of configurations to reduce and clean the effluent gas streams prior to being released from the industrial plant. However, such conventional remedial measures represent a lost opportunity to reuse the effluent gas stream.

As such, there is thus a need for addressing these and/or other issues associated with the prior art.

SUMMARY

A system for pyrolytic emissions looping is provided. In use, the system includes a feed gas stream, and at least one dissociating reactor that receives the feed gas stream. The at least one dissociating reactor outputs, at least in part, a carbon allotrope material and a discharge pyrolytic emissions stream. Additionally, the system includes a gas separating system to separate the discharge pyrolytic emissions stream into at least one species component, where the at least one species component is added to at least the feed gas stream.

In one embodiment, the discharge pyrolytic emissions stream may include molecularly decomposed hydrocarbons, and/or emission byproducts from a pyrolytic process. Additionally, the system may further comprise a second dissociating reactor, where the second dissociating reactor may receive a second feed gas stream, and the at least one species component may be added also to the second feed gas stream.

In another embodiment, the pyrolytic emissions stream includes a thermal decomposition. The thermal decomposition may include a decomposition of at least one hydrocarbon, and/or may occur in the absence of oxygen.

In another embodiment, the at least one species component may include H2. Additionally, a purity of the H2 may be increased as a result of the gas separating system. Further, the at least one dissociating reactor may be configured to dissociate hydrocarbons. The at least one dissociating reactor may be configured to dissociate the hydrocarbons and form at least a first carbon allotrope material. Still yet, the gas separating system may include a cold trap and a multi-stage gas separator. The system may further comprise at least one second dissociating reactor that receives an output of the gas separating system, where the at least one second dissociating reactor may be configured to dissociate the hydrocarbons and form at least a second carbon allotrope material different from the first carbon allotrope material. The system may further comprise at least one third dissociating reactor that receives an output of the gas separating system, where the at least one third dissociating reactor may be configured to dissociate the hydrocarbons and form at least a third carbon allotrope material different from each of the first carbon allotrope material and the second carbon allotrope material.

In another embodiment, the at least one dissociating reactor may be associated with a hydrocarbon site, where the hydrocarbon site includes at least one of oil field, gas field, oil sand, oil shale deposit, coal deposit, offshore oil reserve, offshore gas reserve, shale gas deposit, methane hydrates, oil seep, or gas seep. Additionally, the at least one dissociating reactor may be associated with a remote hydrocarbon site, and at least one of the following provisos are satisfied: where the separation into at least one species component at the remote hydrocarbon site may be configured for hydrocarbon reduction; where the separation into at least one species component at the remote hydrocarbon site may be configured for hydrocarbon abatement; and/or where the separation into at least one species component may reduce discharge of greenhouse gases.

In another embodiment, the at least one dissociating reactor may include a thermal reactor, and/or a microwave reactor. Additionally, all of the at least one species component may be added to the feed gas stream. Further, at least one of the at least one species component may be reused by the pyrolytic emissions looping system.

A system for pyrolytic emissions looping is provided. In use, the system includes a feed gas stream, and at least one dissociating reactor that receives the feed gas stream. The at least one dissociating reactor outputs, at least in part, a carbon allotrope material and a discharge pyrolytic emissions stream. Additionally, the system includes a gas separating system to separate the discharge pyrolytic emissions stream into at least one species component, and a second feed gas stream comprising the at least one species component. Further, the system includes at least one second dissociating reactor that receives the second feed gas stream.

In one embodiment, the discharge pyrolytic emissions stream may include molecularly decomposed hydrocarbons and/or emission byproducts from a pyrolytic process. Additionally, the at least one species component may be further added to the feed gas stream.

In another embodiment, the pyrolytic emissions may include a thermal decomposition. Additionally, the thermal decomposition may include a decomposition of at least one hydrocarbon, and/or may occur in the absence of oxygen.

In another embodiment, the at least one species component may include at least one of Ar, $N_2$, $H_2$, $CH_4$, $O_2$, and/or $CO_2$. Additionally, at least a portion of the at least one species component may be an input stream to at least one of: a proton exchange membrane fuel cell, a third dissociating reactor, a power generation turbine, a catalytic converter, an oxidizer, or a $CO_2$ cracker.

In another embodiment, the at least one dissociating reactor may be configured to dissociate hydrocarbons. Additionally, the at least one dissociating reactor may be configured to dissociate the hydrocarbons and form at least a first carbon allotrope material. The gas separating system may include a cold trap and a multi-stage gas separator. Additionally, the at least one second dissociating reactor may be configured to dissociate hydrocarbons and form a second carbon allotrope material different from the first carbon allotrope material. Further, the system may comprise at least one third dissociating reactor that may receive an output of the gas separating system, where the at least one third dissociating reactor may be configured to dissociate the hydrocarbons and form at least a third carbon allotrope material different from each of the first carbon allotrope material and the second carbon allotrope material.

In another embodiment, the pyrolytic emissions looping system may be configured for a hydrocarbon site, where the hydrocarbon site may include at least one of oil field, gas field, oil sand, oil shale deposit, coal deposit, offshore oil reserve, offshore gas reserve, shale gas deposit, methane hydrates, oil seep, or gas seep. Additionally, the at least one dissociating reactor may be configured for a remote hydrocarbon site, and at least one of the following provisos are satisfied: where the separation into at least one species component at the remote hydrocarbon site may be configured for hydrocarbon reduction; where the separation into at least one species component at the remote hydrocarbon site may be configured for hydrocarbon abatement; and/or where the separation into at least one species component may reduce discharge of greenhouse gases.

In another embodiment, at least one of the at least one dissociating reactor or the at least one second dissociating reactor may include a thermal reactor, and/or a microwave reactor. Additionally, all of the at least one species component may be reused by the pyrolytic emissions looping system. Further, at least one of the at least one species component may be reused by the pyrolytic emissions looping system.

A method for effluent stream abatement via pyrolytic emissions looping is provided. In use, the method includes receiving pyrolytic emissions from a first dissociating reactor, separating the pyrolytic emissions into at least one species component, and adding the at least one species component as feed gas to be provided to at least a second dissociating reactor.

In one embodiment, the pyrolytic emissions include emission byproducts, molecularly decomposed hydrocarbons, and/or a thermal decomposition. Additionally, the thermal decomposition may occur in the absence of oxygen, and/or may include a decomposition of at least one hydrocarbon.

In another embodiment, the second dissociating reactor may include one or more hydrocarbon designed reactors, where the one or more hydrocarbon designed reactors are configured to form a predetermined carbon material allotrope. Additionally, the at least one species component may be further added to a feed gas stream to the first dissociating reactor.

In another embodiment, the at least one species component may include at least one of Ar, $N_2$, $H_2$, $CH_4$, $O_2$, and/or $CO_2$. Additionally, at least a portion of the at least one species component may be an input stream to at least one of: a proton exchange membrane fuel cell, a third dissociating reactor, a power generation turbine, a catalytic converter, an oxidizer, and/or a $CO_2$ cracker.

In another embodiment, the first dissociating reactor and the second dissociating reactor may each be configured to dissociate hydrocarbons. Additionally, the first dissociating reactor may be configured to dissociate the hydrocarbons and form at least a first carbon allotrope material. The second dissociating reactor may be configured to dissociate hydrocarbons and form a second carbon allotrope material different from the first carbon allotrope material. Further, the method may comprise receiving at least in part the at least one species component from a third dissociating reactor that receives, where the third dissociating reactor is configured to dissociate the hydrocarbons and form at least a third carbon allotrope material different from each of the first carbon allotrope material and the second carbon allotrope material.

In another embodiment, at least one of the first dissociating reactor or the second dissociating reactor may be configured for a hydrocarbon site, where the hydrocarbon site includes at least one of oil field, gas field, oil sand, oil shale deposit, coal deposit, offshore oil reserve, offshore gas reserve, shale gas deposit, methane hydrates, oil seep, and/or gas seep. Additionally, at least one of the first dissociating reactor or the second dissociating reactor may be configured for a remote hydrocarbon site, and at least one of the following provisos are satisfied: where the separation into at least one species component at the remote hydrocarbon site is configured for hydrocarbon reduction; where the separation into at least one species component at the remote hydrocarbon site is configured for hydrocarbon abatement; and/or where the separation into at least one species component reduces discharge of greenhouse gases.

In another embodiment, at least one of the first dissociating reactor or the second dissociating reactor may include a thermal reactor, and/or a microwave reactor. Additionally, all of the at least one species component may be reused by one or more of the first dissociating reactor, the second dissociating reactor, and/or a third dissociating reactor. Further, at least one of the at least one species component may be reused by at least one of the first dissociating reactor, and/or the second dissociating reactor.

A method for green energy production and effluent waste stream recycling is provided. In use, the method includes receiving pyrolytic emissions from a dissociating reactor, separating the pyrolytic emissions into at least one species component, and using the at least one species component to generate energy.

In one embodiment, the at least one species component may include hydrogen. Additionally, the energy may be generated by a proton exchange membrane fuel cell that uses the hydrogen as an input. Further, the at least one species component may include methane. Additionally, the energy may be generated by a power generator turbine that uses the methane.

In another embodiment, the energy may be generated using green technology based on recycling the separated pyrolytic emissions. Additionally, the energy may be generated at a hydrocarbon site. For example, the hydrocarbon site may include at least one of oil field, gas field, oil sand, oil shale deposit, coal deposit, offshore oil reserve, offshore gas reserve, shale gas deposit, methane hydrates, oil seep, and/or gas seep.

In another embodiment, the energy may be generated at a remote hydrocarbon site. Additionally, the separation into at least one species component at the hydrocarbon site may be configured for hydrocarbon reduction and/or hydrocarbon abatement. Further, the separation into at least one species component may reduce discharge of greenhouse gases. For example, the greenhouse gases may include at least one of $CO_2$, $CH_4$, $N_2O$, $SF_6$, $NF_3$, hydrofluorocarbons, and/or perflurocarbons.

In another embodiment, the first dissociating reactor may be configured to dissociate the hydrocarbons and form at least a first carbon allotrope material. Additionally, the second dissociating reactor may be configured to dissociate the hydrocarbons and form at least a a second carbon allotrope material. Further, the method may include inputting at least part of the at least one species component to the first dissociating reactor. The at least one species component may be recycled via the first dissociating reactor, the second dissociating reactor, or a third dissociating reactor. Further, the recycling may be compliant with governmental regulations and/or the recycling may produce a near-zero emission effluent stream.

In another embodiment, the method may include receiving, at an oxidizer, at least in part, the at least one species component, and sending an output from the oxidizer to a power generation turbine to generate the energy.

DETAILED DESCRIPTION

Figure 1:
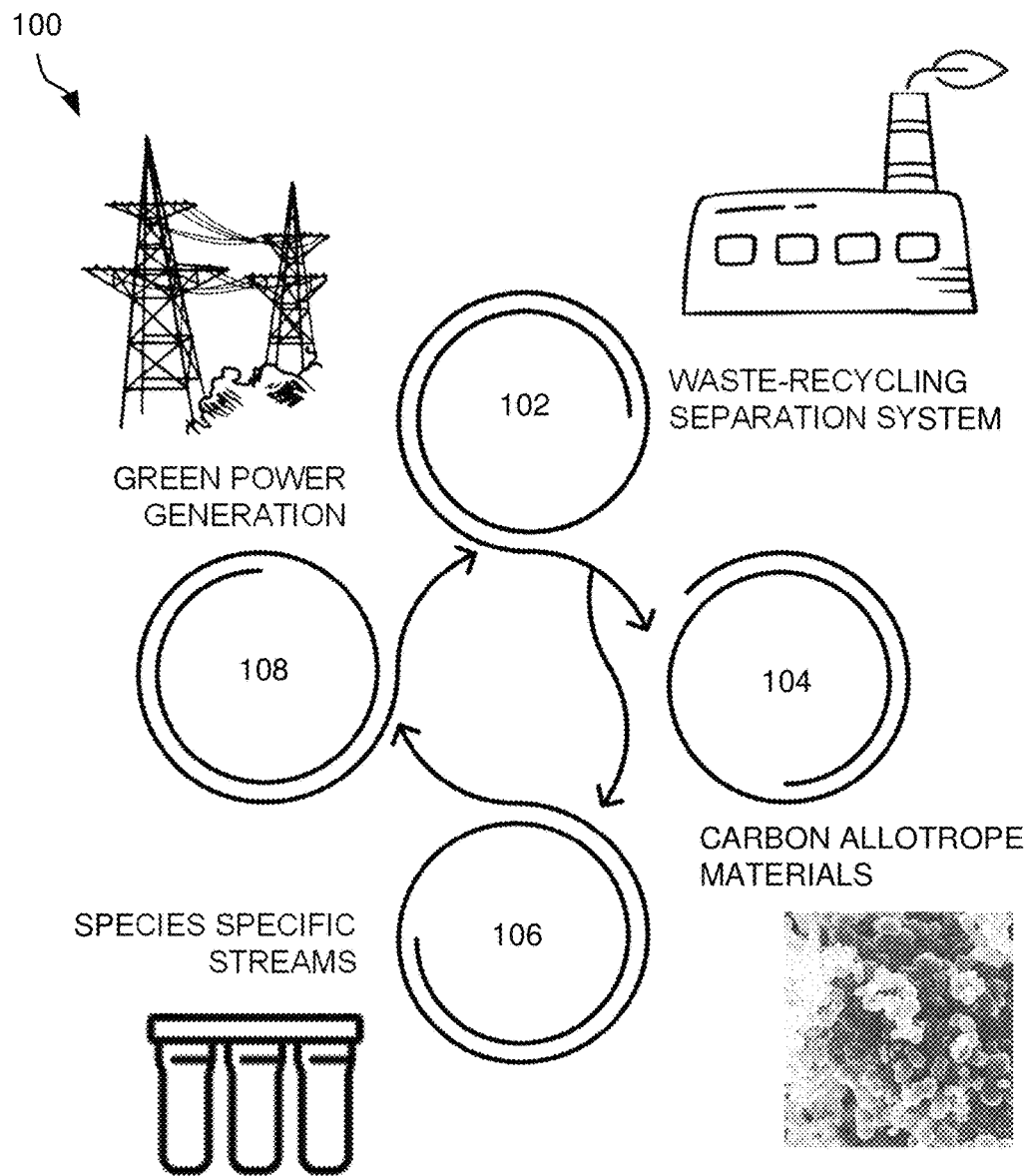
FIG. 1 illustrates a green method for material production, power generation, and effluent waste stream recycling, in accordance with one embodiment.

Effluent waste gas (i.e., industrial emissions) is known to cause many issues. For example, pollutants (found in effluent waste gas) can cause air pollution, and in turn, cause respiratory problems and aggravate existing conditions such as asthma and lung cancer. Other environmental effects may include climate change (contributions to global greenhouse gas emissions), acid rain (due to emissions of sulfur dioxide and nitrogen oxides, at a minimum), water pollution (when the gas is combined with water), and/or smog. Due to such negative ramifications, various regulations (imposed generally by governmental agencies) have been created to mitigate the negative effects of these pollutants, typically found in effluent waste gas. Additionally, technologies developed thus far have focused largely on reducing or cleaning these pollutants found in effluent waste gas (i.e. gas emissions).

Rather than focusing on cleaning such effluent waste gas streams (in a manner consistent with prior art systems), the focus of the present disclosure is on how to reuse the effluent waste gas stream (which in turn would directly result in less or potentially no gas emissions, particularly with respect to the pollutants discussed hereinabove).

In particular, the effluent waste gas stream can be separated into individual species components. As species-specific components, the industrial system can use (or reuse) each of the species-specific components as needed within the industrial system, and/or potentially release non-toxic gases. Such a system may rely, at least in part, on a pyrolytic decomposition reactor, which may be used, in combination with a separation system (to separate into species-specific components), to increase carbon allotrope material (CAM) production, more effectively utilize inert gases (such as $N_2$, Ar, etc.), and produce greener non-toxic gas (such as $H_2$) output.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A. X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments-they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Within the context of the present disclosure, pyrolytic emissions include emissions resulting, at least in part, from a pyrolysis process. Additionally, thermal decomposition includes a chemical decomposition resulting from heat. In various embodiments, thermal decomposition may occur at very high temperatures (such as in excess of 500° F. or 750° F.), and/or in the absence of oxygen.

Within the context of the present disclosure, carbon allotrope material (CAM) includes all potential carbon material products. For example, potential carbon material products may include carbon nano-onions (CNOs), thermal graphene (TG), and/or microwave graphene (MWG). In one embodiment, the potential carbon material products may come from a hydrocarbon fed process. Additionally, as used herein, a Greek prefix (in combination with a CAM may denote the type of hydrocarbon source. For example, alpha CAMs may be derived from methane (CH4) and/or compressed natural gas (CNG), beta CAMs may be derived from non-condensable polycyclic aromatic hydrocarbons (PAHs) at room temperature, and/or gamma CAMs may be derived from condensable PAHs (i.e. heavy hydrocarbons) at room temperature. Additionally, alpha CAMs may include, but not be limited to, alpha-CNO, alpha-TG, and/or alpha-MWG; beta CAMs may include, but not be limited to beta-CNO, beta-TG, and/or beta-MWG; and/or gamma CAMs may include, but not be limited to gamma-CNO, gamma-TG, and/or gamma-MWG.

Descriptions of Exemplary Embodiments

FIG. 1 illustrates a green method 100 for material production, power generation, and effluent waste stream recycling, in accordance with one embodiment.

As shown, the green method 100 comprises a waste-recycling separation system, from which carbon allotrope materials 104 and species-specific streams 106 are the products. See operation 102. The species-specific streams may then be used for green power generation. See operation 108. In one embodiment, the waste-recycling separation system may receive, as input, pyrolytic emissions.

For example, the green method 100 may include receiving pyrolytic emissions from a dissociating reactor, separating the pyrolytic emissions into at least one species component, and using the at least one species component to generate energy.

In one embodiment, the at least one species component may include hydrogen. Additionally, the energy may be generated by a proton exchange membrane fuel cell that uses the hydrogen as an input. Further, the at least one species component may include methane. Additionally, the energy may be generated by a power generator turbine that uses the methane.

In another embodiment, the energy may be generated using green technology based on recycling the separated pyrolytic emissions. Additionally, the energy may be generated at a hydrocarbon site. For example, the hydrocarbon site may include at least one of oil field, gas field, oil sand, oil shale deposit, coal deposit, offshore oil reserve, offshore gas reserve, shale gas deposit, methane hydrates, oil seep, and/or gas seep.

In another embodiment, the energy may be generated at a remote hydrocarbon site. Additionally, the separation into at least one species component at the hydrocarbon site may be configured for hydrocarbon reduction and/or hydrocarbon abatement. Further, the separation into at least one species component may reduce discharge of greenhouse gases. For example, the greenhouse gases may include at least one of $CO_2$, $CH_4$, $N_2O$, $SF_6$, $NF_3$, hydrofluorocarbons, and/or perflurocarbons.

In another embodiment, the first dissociating reactor may be configured to dissociate the hydrocarbons and form at least a first carbon allotrope material. Additionally, the second dissociating reactor may be configured to dissociate the hydrocarbons and form at least a second carbon allotrope material. Further, the method may include inputting at least part of the at least one species component to the first dissociating reactor. The at least one species component may be recycled via the first dissociating reactor, the second dissociating reactor, or a third dissociating reactor. Further, the recycling may be compliant with governmental regulations and/or the recycling may produce a near-zero emission effluent stream.

In another embodiment, the method may include receiving, at an oxidizer, at least in part, the at least one species component, and sending an output from the oxidizer to a power generation turbine to generate the energy.

Figure 2:
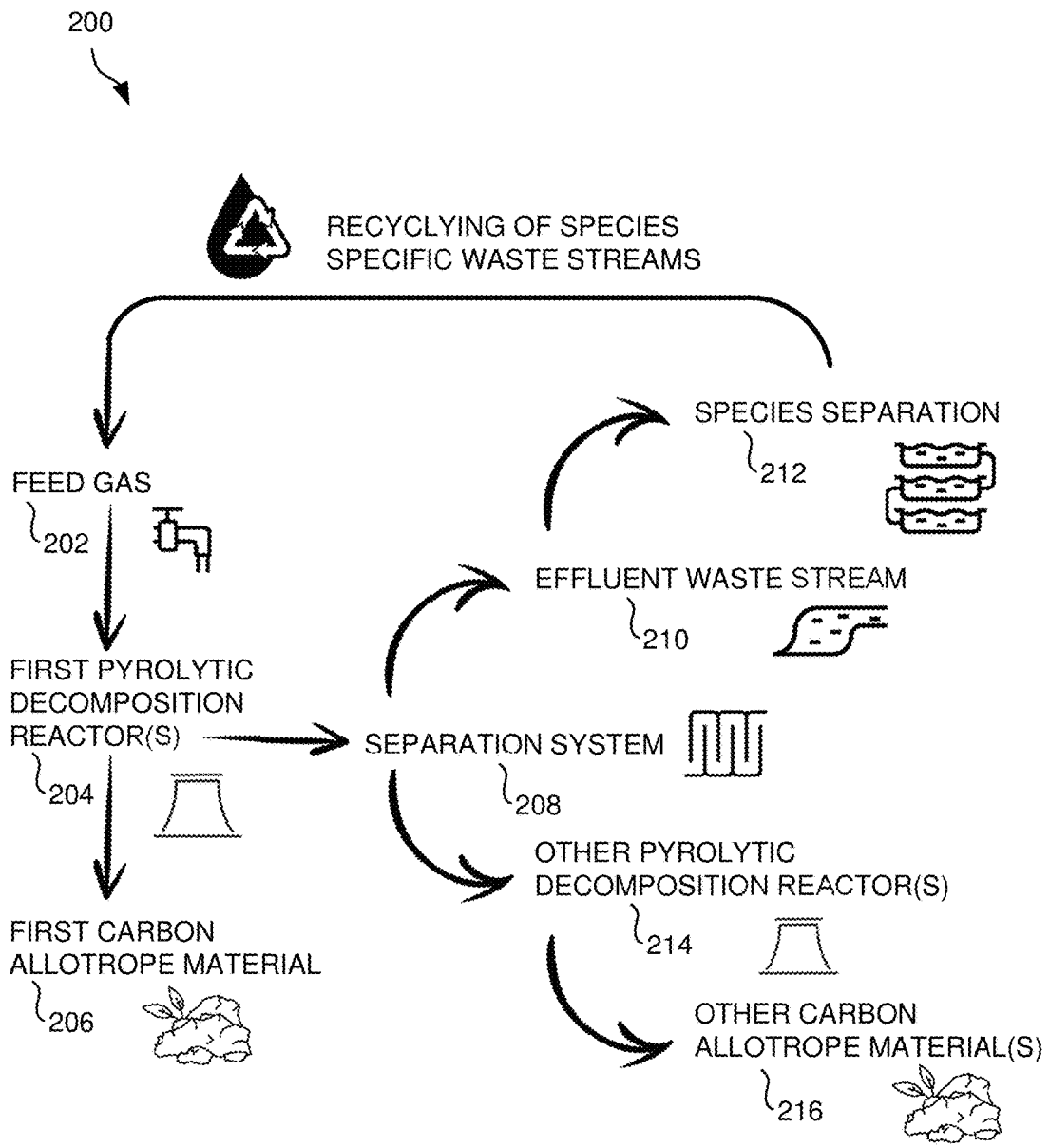
FIG. 2 illustrates a statutory-compliant, near zero-emission, and effluent stream recycling system, in accordance with one embodiment.

FIG. 2 illustrates a system 200 for statutory-compliant, near zero-emission, and effluent stream recycling, in accordance with one embodiment. As an option, the system 200 may be implemented in the context of any one or more of the embodiments set forth in any previous and/or subsequent figure(s) and/or description thereof. Of course, however, the system 200 may be implemented in the context of any desired environment. Further, the aforementioned definitions may equally apply to the description below.

As shown, the system 200 may comprise a feed gas 202 entering first pyrolytic decomposition reactor(s) 204, where the feed gas 202 transmutes into one or more species-specific gasses for recycling (received at a separation system 208), and a first carbon allotrope material 206. Additionally, the system 200 may comprise a separation system 208, into which any species-specific gasses from first pyrolytic decomposition reactor(s) 204 may be further separated. Outputs from the separation system 208 may include feeds to one or more other pyrolytic decomposition reactions 214 for further treatment, with discarded gas not needed for the other pyrolytic decomposition reactor(s) sent to an effluent waste stream 210.

Further, the system 200 may include performing species separation 212 on the effluent waste stream 210. After separation, the one or more resulting species-specific waste streams may be fed back to the feed gas 202. In one embodiment, the feed gas 202 (with the species-specific waste streams) may be fed back into the first pyrolytic decomposition reactor 204 for decomposition.

Further still, in another embodiment, the species-specific waste streams may be used in whole, or in part, as components directly fed into one or more pyrolytic decomposition reactor(s), and/or to another unit within the process. For example, a specific chemical process may have need of an inert gas for a chemical process, or a specific species (such as $H_2$) may be needed for a proton exchange membrane (PEM) fuel cell, etc. Thus, the species-specific waste streams may be fed as needed into any component (reactor, fuel cell, combustion unit, crackers, power generation turbine, etc.).

In one embodiment, the pyrolytic decomposition process may result in consumption of a majority (or even near all) of hydrocarbons, and may result in outputting carbon allotrope materials as well as hydrogen gas (among possible others) at higher temperatures (such as between 900-1700° C.). For example, a reaction environment for decomposition may include a temperature gradient range of between 900-1700° C. to potentially cause a full conversion of all hydrocarbons to carbon allotrope materials and other byproducts (such as hydrogen products, etc.).

In another embodiment, a pyrolytic decomposition process may be performed using thermal energy and/or microwave pyrolysis. It should be noted that both thermal and microwave pyrolytic decomposition may be performed in series to provide yet another method of pyrolysis. For example, carbon graphene resulting from a microwave pyrolytic decomposition process may then be treated with further thermal cracking in order to produce what may be referred to as "decorated carbon."

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 3:
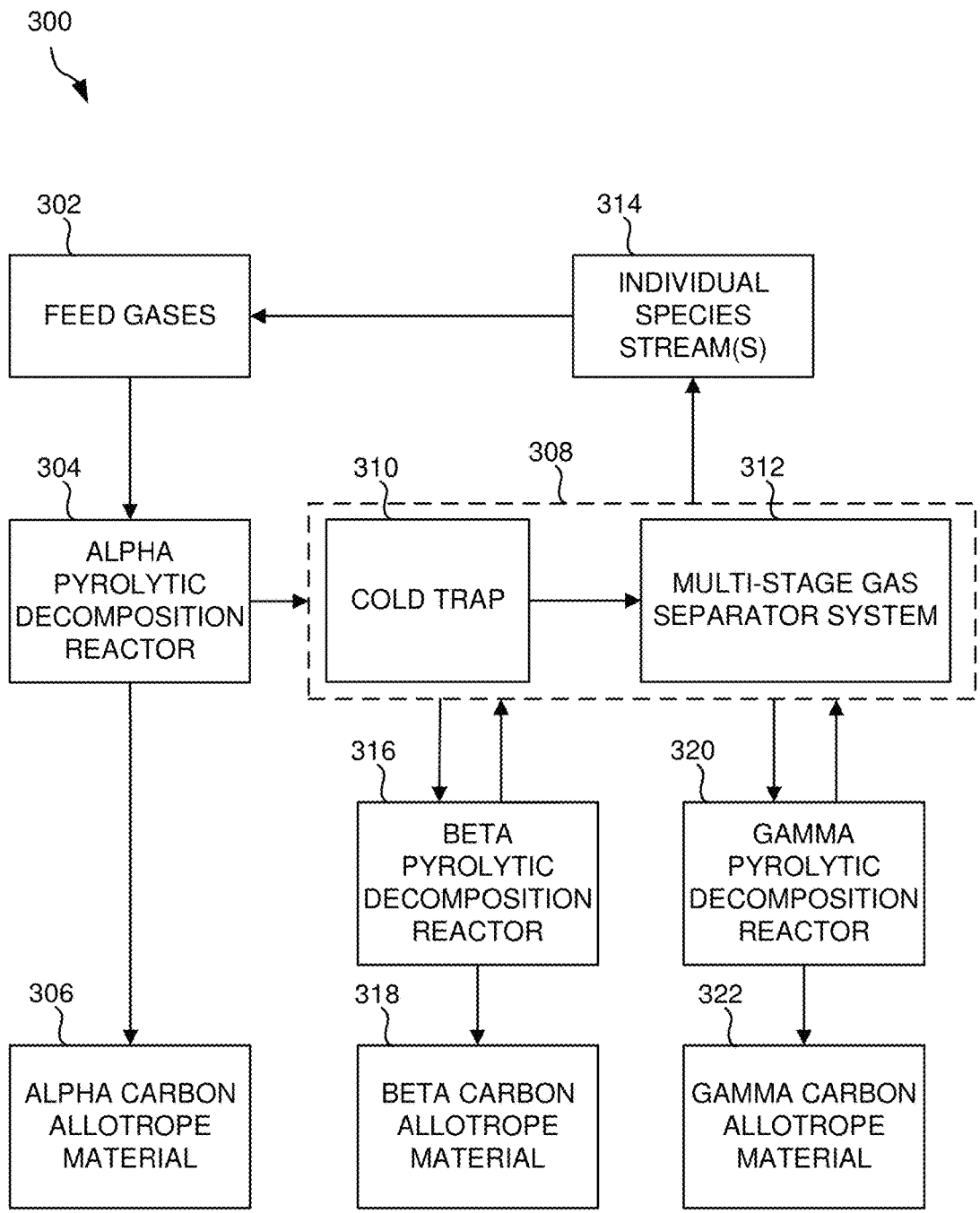
FIG. 3 illustrates a system for hydrocarbon abatement via pyrolytic emission looping, in accordance with one embodiment.

FIG. 3 illustrates a system 300 for hydrocarbon abatement via pyrolytic emission looping, in accordance with one embodiment. As an option, the system 300 may be implemented in the context of any one or more of the embodiments set forth in any previous and/or subsequent figure(s) and/or description thereof. Of course, however, the system 300 may be implemented in the context of any desired environment. Further, the aforementioned definitions may equally apply to the description below.

As shown, the system 300 may comprise one or more feed gases 302 entering an alpha pyrolytic decomposition reactor 304, where the feed gases 302 may result in an alpha carbon allotrope material 306, and waste gases. In the context of the present description, the alpha carbon allotrope material 306 may include primary hydrocarbons, such as, but not limited to, carbon nano-onions (CNOs), thermal graphenes (TGs), and/or microwave graphenes (MWGs). Within the alpha pyrolytic decomposition reactor 304, the one or more feed gases 302 (such as compressed natural gas (CNG)) may yield the alpha carbon allotrope material 306, as well as polycyclic aromatic hydrocarbons (PAHs) (such as but not limited to condensable/heavy, non-condensable/light), and/or hydrogen gas.

The waste gases outputted from the alpha pyrolytic decomposition reactor 304 may be fed to a gas separating system 308, which may further comprise a primary cold trap 310 and multi-stage gas separator system 312. The multi-stage gas separator system 312 may be used to separate out syngas feed (including but not limited to hydrogen, carbon monoxide, carbon dioxide, and/or methane, etc.), which turn, may be fed to the beta pyrolytic decomposition reactor 316, for transmutation into beta carbon allotrope material 318. In the context of the present description, the syngas feed may include non-condensable components of the effluent stream.

In one embodiment, a portion of the non-reacted gas from the beta pyrolytic decomposition reactor 316 may be fed back to the gas separating system 308 for further processing. Additionally, the syngas, in combination with compressed natural gas, may be fed into the beta pyrolytic decomposition reactor 316 for transmutation into the beta carbon allotrope material 318. In the context of the present description, the beta carbon allotrope material 318 may include secondary hydrocarbons. Further, as described herein, beta-CAMs may include beta-CNOs, beta-TG, and/or beta-MWG. Further, the beta pyrolytic decomposition reactor 316 may also produce PAHs and/or hydrogen gas. Still yet, the beta carbon allotrope material 318 may be based on a variety of hydrocarbon input sources (but not limited to the following): methane, ethane, propane, butane, pentanes, isobutane, acetylene, hexane, propylene, polypropylene, methylacetylene-propadiene propane and/or derivatives thereof. It is to be appreciated that other CAMs may be, in like manner, based on one or more of the foregoing hydrocarbon input sources.

The cold trap 310 of the gas separating system 308 may be used to separate out condensable components of the effluent stream (such as the waste gases outputted from the alpha pyrolytic decomposition reactor 304). Such condensable components may be fed to a gamma pyrolytic decomposition reactor 320, where inputted components may transmute into gamma carbon allotrope material 322. In one embodiment, the condensable components may include re-gasified heavy hydrocarbons. In the context of the present description, the gamma carbon allotrope material 322 may include tertiary hydrocarbons. Further, as described herein, gamma-CAMs may include gamma-CNOs, gamma-TG, and/or gamma-MWGXXXX. Further, the gamma pyrolytic decomposition reactor 320 may also produce PAHs and/or hydrogen gas.

In one embodiment, the re-gasification of the condensable components (used in the gamma pyrolytic decomposition reactor 320) may also produce PAHs and/or hydrogen gas. Additionally, in one embodiment, the condensable components may be fed to a furnace reactor (such as a thermal reactor, plasma reactor, microwave reactor, and/or furnace) in combination with the gamma pyrolytic decomposition reactor 320.

In one embodiment, the system 300 may theoretically cause up to, theoretically, near 100 percent consumption of hydrocarbon effluent output by repeatedly "looping" individual species stream(s) 314, which in turn, may assist with reducing or eliminating waste output. In addition, the system 300 may be used to reduce or eliminate methane and/or non-methane hydrocarbons (which in turn may be oxidized into $CO_2$ and $H_2O$). Of course, it is to be appreciated that near 100% consumption of any hydrocarbon effluent may require that all hydrocarbons are fed back to the system 300, and that no leaks occur along the way. As an example, in order to maximize consumption of hydrocarbon effluent, a reactor exit may be the input of the next reactor, such that several reactors in a series may each convert different hydrocarbons into end-products.

The gas separating system 308 may output individual species stream(s) 314, which may include output (components not used in the effluent stream) from the alpha pyrolytic decomposition reactor 304, the beta pyrolytic decomposition reactor 316, and/or the gamma pyrolytic decomposition reactor 320. Such output may be separated via the gas separating system 308 such that individual species streams (via individual species stream(s) 314) may be outputted. The individual species stream(s) 314 may include, but not be limited to, argon (Ar), hydrogen ($H_2$), nitrogen ($N_2$), and/or methane ($CH_4$). These individual species stream(s) 314, in one embodiment, may be fed back into the feed gas 302, which in turn may be recirculated through they system 300 (proceeding, in one embodiment, to the alpha pyrolytic decomposition reactor 304).

In other embodiments (and as disclosed further with respect to accompanying figures), the individual species stream(s) 314 passed from the gas separating system 308 may be routed to an alternative reactor (or alternative reactors). For example, a first species-specific stream of the individuals species stream(s) 314 may be routed to the alphas pyrolytic decomposition reactor 304, whereas a second species-specific stream of the individuals species stream (s) 314 may be routed to the beta pyrolytic decomposition reactor 316, the gamma pyrolytic decomposition reactor 320, and/or another reactor. In this manner, the individual species-specific streams of the individual species stream(s) 314 may be used in a specific manner and for a specific use. In other embodiments, the individual species-specific streams of the individual species stream(s) 314 may be used in other processes rather than recycled and/or repeatedly passed through pyrolytic reaction processes.

In another embodiment, the cold trap 310 may assist with condensing and filtering out heavy hydrocarbons, condensable hydrocarbons, and/or condensable polycyclic aromatic hydrocarbons (PAH). In one embodiment, the cold trap 310 may be used at room temperature. In addition, the cold trap 310 may operate in one or more phases, including a capture phase and/or a distillation phase. In one embodiment, the one or more phases may be designed to operate mutually-exclusive of one another. For example, a capture phase may operate in a cold setting to condense gaseous materials, and once full, the trap may shift to a distillation phase to further refine and/or separate the components of the effluent stream.

In one embodiment, internal baffles of the cold trap 310 may be employed to deliberately slow passage of the components of the effluent stream during the capture phase. In another embodiment, to facilitate a heated distillation mode within the cold trap 310, the internal baffles through which the individual species stream(s) 314 are passed may be surrounded by a heating element structure designed to increase temperatures as efficiently as possible when shifting from capture mode to distillation mode. Further discussion in relation to the cold trap 310 may be found herein with respect to FIG. 14.

In one embodiment, a system for pyrolytic emissions looping is provided. In use, the system includes a feed gas stream, and at least one dissociating reactor that receives the feed gas stream. The at least one dissociating reactor outputs, at least in part, a carbon allotrope material and a discharge pyrolytic emissions stream. Additionally, the system includes a gas separating system to separate the discharge pyrolytic emissions stream into at least one species component, where the at least one species component is added to at least the feed gas stream.

In one embodiment, the discharge pyrolytic emissions stream may include molecularly decomposed hydrocarbons, and/or emission byproducts from a pyrolytic process. Additionally, the system may further comprise a second dissociating reactor, where the second dissociating reactor may receive a second feed gas stream, and the at least one species component may be added also to the second feed gas stream.

In another embodiment, the pyrolytic emissions stream includes a thermal decomposition. The thermal decomposition may include a decomposition of at least one hydrocarbon, and/or may occur in the absence of oxygen.

In another embodiment, the at least one species component may include $H_2$. Additionally, a purity of the $H_2$ may be increased as a result of the gas separating system. Further, the at least one dissociating reactor may be configured to dissociate hydrocarbons. The at least one dissociating reactor may be configured to dissociate the hydrocarbons and form at least a first carbon allotrope material. Still yet, the gas separating system may include a cold trap and a multi-stage gas separator. The system may further comprise at least one second dissociating reactor that receives an output of the gas separating system, where the at least one second dissociating reactor may be configured to dissociate the hydrocarbons and form at least a second carbon allotrope material different from the first carbon allotrope material. The system may further comprise at least one third dissociating reactor that receives an output of the gas separating system, where the at least one third dissociating reactor may be configured to dissociate the hydrocarbons and form at least a third carbon allotrope material different from each of the first carbon allotrope material and the second carbon allotrope material.

In another embodiment, the at least one dissociating reactor may be associated with a hydrocarbon site, where the hydrocarbon site includes at least one of oil field, gas field, oil sand, oil shale deposit, coal deposit, offshore oil reserve, offshore gas reserve, shale gas deposit, methane hydrates, oil seep, or gas seep. Additionally, the at least one dissociating reactor may be associated with a remote hydrocarbon site, and at least one of the following provisos are satisfied: where the separation into at least one species component at the remote hydrocarbon site may be configured for hydrocarbon reduction; where the separation into at least one species component at the remote hydrocarbon site may be configured for hydrocarbon abatement; and/or where the separation into at least one species component may reduce discharge of greenhouse gases.

In another embodiment, the at least one dissociating reactor may include a thermal reactor, and/or a microwave reactor. Additionally, all of the at least one species component may be added to the feed gas stream. Further, at least one of the at least one species component may be reused by the pyrolytic emissions looping system.

A system for pyrolytic emissions looping is provided. In use, the system includes a feed gas stream, and at least one dissociating reactor that receives the feed gas stream. The at least one dissociating reactor outputs, at least in part, a carbon allotrope material and a discharge pyrolytic emissions stream. Additionally, the system includes a gas separating system to separate the discharge pyrolytic emissions stream into at least one species component, and a second feed gas stream comprising the at least one species component. Further, the system includes at least one second dissociating reactor that receives the second feed gas stream.

In one embodiment, the discharge pyrolytic emissions stream may include molecularly decomposed hydrocarbons and/or emission byproducts from a pyrolytic process. Additionally, the at least one species component may be further added to the feed gas stream.

In another embodiment, the pyrolytic emissions may include a thermal decomposition. Additionally, the thermal decomposition may include a decomposition of at least one hydrocarbon, and/or may occur in the absence of oxygen.

In another embodiment, the at least one species component may include at least one of Ar, $N_2$, $H_2$, $CH_4$, $O_2$, or $CO_2$. Additionally, at least a portion of the at least one species component may be an input stream to at least one of: a proton exchange membrane fuel cell, a third dissociating reactor, a power generation turbine, a catalytic converter, an oxidizer, or a $CO_2$ cracker.

In another embodiment, the at least one dissociating reactor may be configured to dissociate hydrocarbons. Additionally, the at least one dissociating reactor may be configured to dissociate the hydrocarbons and form at least a first carbon allotrope material. The gas separating system may include a cold trap and a multi-stage gas separator. Additionally, the at least one second dissociating reactor may be configured to dissociate hydrocarbons and produce a second carbon allotrope material different from the first carbon allotrope material. Further, the system may comprise at least one third dissociating reactor that may receive an output of the gas separating system, where the at least one third dissociating reactor may be configured to dissociate the hydrocarbons and form at least a third carbon allotrope material different from each of the first carbon allotrope material and the second carbon allotrope material.

In another embodiment, the pyrolytic emissions looping system may be configured for a hydrocarbon site, where the hydrocarbon site may include at least one of oil field, gas field, oil sand, oil shale deposit, coal deposit, offshore oil reserve, offshore gas reserve, shale gas deposit, methane hydrates, oil seep, or gas seep. Additionally, the at least one dissociating reactor may be configured for a remote hydrocarbon site, and at least one of the following provisos are satisfied: where the separation into at least one species component at the remote hydrocarbon site may be configured for hydrocarbon reduction; where the separation into at least one species component at the remote hydrocarbon site may be configured for hydrocarbon abatement; and/or where the separation into at least one species component may reduce discharge of greenhouse gases.

In another embodiment, at least one of the at least one dissociating reactor or the at least one second dissociating reactor may include a thermal reactor, and/or a microwave reactor. Additionally, all of the at least one species component may be reused by the pyrolytic emissions looping system. Further, at least one of the at least one species component may be reused by the pyrolytic emissions looping system.

A method for effluent stream abatement via pyrolytic emissions looping is provided. In use, the method includes receiving pyrolytic emissions from a first dissociating reactor, separating the pyrolytic emissions into at least one species component, and adding the at least one species component as feed gas to be provided to at least a second dissociating reactor.

In one embodiment, the pyrolytic emissions include emission byproducts, molecularly decomposed hydrocarbons, and/or a thermal decomposition. Additionally, the thermal decomposition may occur in the absence of oxygen, and/or may include a decomposition of at least one hydrocarbon.

In another embodiment, the second dissociating reactor may include one or more hydrocarbon designed reactors, where the one or more hydrocarbon designed reactors are configured to form a predetermined carbon material allotrope. Additionally, the at least one species component may be further added to a feed gas stream to the first dissociating reactor.

In another embodiment, the at least one species component may include at least one of Ar, $N_2$, $H_2$, $CH_4$, $O_2$, and/or $CO_2$. Additionally, at least a portion of the at least one species component may be an input stream to at least one of: a proton exchange membrane fuel cell, a third dissociating reactor, a power generation turbine, a catalytic converter, an oxidizer, and/or a $CO_2$ cracker.

In another embodiment, the first dissociating reactor and the second dissociating reactor may each be configured to dissociate hydrocarbons. Additionally, the first dissociating reactor may be configured to dissociate the hydrocarbons and form at least a first carbon allotrope material. The second dissociating reactor may be configured to dissociate hydrocarbons and may be configured to dissociate the hydrocarbons and form at least a second carbon allotrope material different from the first carbon allotrope material. Further, the method may comprise receiving at least in part the at least one species component from a third dissociating reactor that receives, where the third dissociating reactor is configured to dissociate the hydrocarbons and form at least a third carbon allotrope material different from each of the first carbon allotrope material and the second carbon allotrope material.

In another embodiment, at least one of the first dissociating reactor or the second dissociating reactor may be configured for a hydrocarbon site, where the hydrocarbon site includes at least one of oil field, gas field, oil sand, oil shale deposit, coal deposit, offshore oil reserve, offshore gas reserve, shale gas deposit, methane hydrates, oil seep, and/or gas seep. Additionally, at least one of the first dissociating reactor or the second dissociating reactor may be configured for a remote hydrocarbon site, and at least one of the following provisos are satisfied: where the separation into at least one species component at the remote hydrocarbon site is configured for hydrocarbon reduction; where the separation into at least one species component at the remote hydrocarbon site is configured for hydrocarbon abatement; and/or where the separation into at least one species component reduces discharge of greenhouse gases.

In another embodiment, at least one of the first dissociating reactor or the second dissociating reactor may include a thermal reactor, and/or a microwave reactor. Additionally, all of the at least one species component may be reused by one or more of the first dissociating reactor, the second dissociating reactor, and/or a third dissociating reactor. Further, at least one of the at least one species component may be reused by at least one of the first dissociating reactor, and/or the second dissociating reactor.

Figure 4:
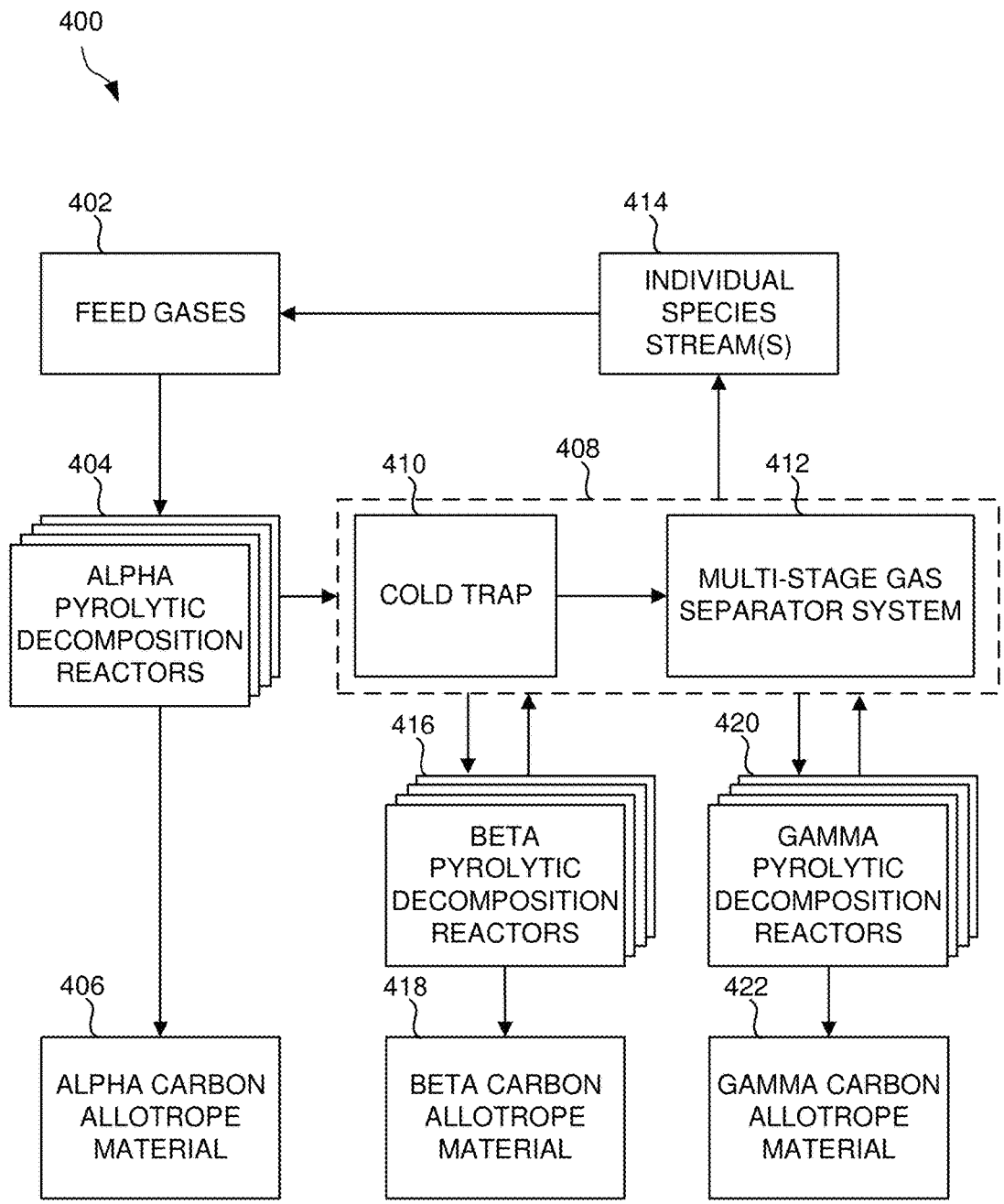
FIG. 4 illustrates a system for hydrocarbon abatement via pyrolytic emission looping, in accordance with one embodiment.

FIG. 4 illustrates a system 400 for hydrocarbon abatement via pyrolytic emission looping, in accordance with one embodiment. As an option, the system 400 may be implemented in the context of any one or more of the embodiments set forth in any previous and/or subsequent figure(s) and/or description thereof. Of course, however, the system 400 may be implemented in the context of any desired environment. Further, the aforementioned definitions may equally apply to the description below.

As shown, the system 400 may comprise one or more feed gases 402 entering one or more alpha pyrolytic decomposition reactors 404, where the feed gases 402, at least in part, may transmute into an alpha carbon allotrope material 406. Additionally, the system 400 may comprise a gas separating system 408, within which a primary cold trap 410 and multi-stage gas separator system 412 components further process an effluent stream from, for example, the alpha pyrolytic decomposition reactors 404. Further, the gas separation system 408 may be used to pass non-condensable components of the effluent stream to one or more beta pyrolytic decomposition reactors 416, where the non-condensable components may be transmuted into beta carbon allotrope material 418. Further, the gas separating system 408 may be used to pass condensable components of the effluent stream to one or more gamma pyrolytic decomposition reactors 420, where the non-condensable components may be transmuted into gamma carbon allotrope material 422.

In one embodiment, waste streams (not consumed components) from the beta pyrolytic decomposition reactors 416 and/or the gamma pyrolytic decomposition reactors 420 may be passed back to the gas separating system 408. The gas separating system 408, in turn, may separate the output stream into individual species stream(s) 414. The individual species stream(s) 414, in turn, may then be fed back to the feed gases 402, and/or used in a species-specific manner (for example, argon as an inert, etc.).

In comparing the system 300 to the system 400, it is noted that the system 300 includes single reactor units, whereas the system 400 displays a ramped-up configuration with as many reactor units as needed. Thus, in comparing the system 300 to the system 400, it is to be appreciated that the details of the system 300 may relate equally to the components and details of the system 400. Further, the ramped up configuration can be configured with any type and number of pyrolytic reactors capable of sustaining dynamic processes. Additionally, in such a ramped up configuration of the system 400, it is to be further appreciated that additional systems (e.g. PEM fuel cell, power generation, etc.) may be used in combination with the individual species stream(s) 414.

Figure 5:
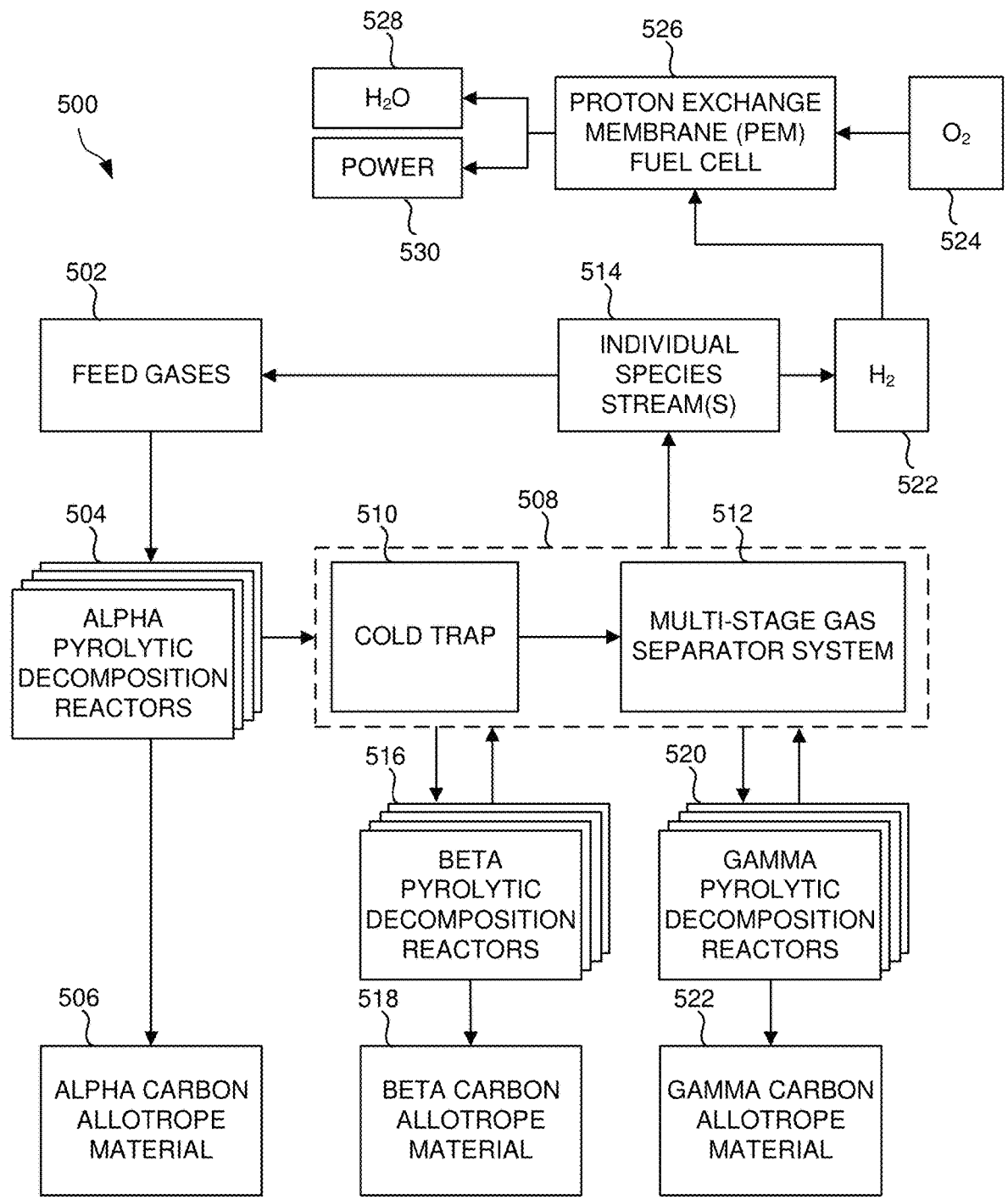
FIG. 5 illustrates a system for power generation using pyrolytic emission looping, in accordance with one embodiment.

FIG. 5 illustrates a system 500 for power generation using pyrolytic emission looping, in accordance with one embodiment. As an option, the system 500 may be implemented in the context of any one or more of the embodiments set forth in any previous and/or subsequent figure(s) and/or description thereof. Of course, however, the system 500 may be implemented in the context of any desired environment. Further, the aforementioned definitions may equally apply to the description below.

As shown, the system 500 may comprise one or more feed gases 502 entering one or more alpha pyrolytic decomposition reactors 504, where the feed gases 502, at least in part, may transmute into an alpha carbon allotrope material 506. Additionally, the system 500 may comprise a gas separating system 508, within which a primary cold trap 510 and multi-stage gas separator system 512 components further process an effluent stream from, for example, the alpha pyrolytic decomposition reactors 504. Further, the gas separation system 508 may be used to pass non-condensable components of the effluent stream to one or more beta pyrolytic decomposition reactors 516, where the non-condensable components may be transmuted into beta carbon allotrope material 518. Further, the gas separating system 508 may be used to pass condensable components of the effluent stream to one or more gamma pyrolytic decomposition reactors 520, where the non-condensable components may be transmuted into gamma carbon allotrope material 522.

In one embodiment, waste streams (not consumed components) from the beta pyrolytic decomposition reactors 516 and/or the gamma pyrolytic decomposition reactors 520 may be passed back to the gas separating system 508. The gas separating system 508, in turn, may separate the output stream into individual species stream(s) 514. The individual species stream(s) 514, in turn, may then be fed back to the feed gases 502, and/or used in a species-specific manner (for example, argon as an inert, etc.).

Further still, the system 500 may comprise isolating and extracting hydrogen gas ($H_2$) 522 from the individual species stream(s) 514 to be passed into a proton exchange membrane (PEM) fuel cell 526 to facilitate power production. For example, the PEM fuel cell 526 may also receive oxygen gas ($O_2$), which in combination with the hydrogen gas ($H_2$), may be used to produce water ($H_2O$) and power 530.

In comparing the system 500 to the system 400, it is to be appreciated that details of the system 400 may equally apply to the system 500. Additionally, the system 500 displays an exemplary use of a hydrogen species stream (from the individual species stream(s) which, in turn, may be used within a PEM cell 526 to assist with generating power. In one embodiment, the power 530 generated may be used, in turn, to provide electric needs back to functions of the system 500. In this manner, one or more components of the individual species stream(s) 514 may be recouped and used in a manner such that waste streams are minimized and the chemical process plant may be potentially energy independent in generating electricity based on an effluent stream that would have otherwise been conventionally discarded. In this manner, the power 530 generated may be fed back into the system to bolster self-sufficiency and/or may be pushed out to external power stations capable of providing needed power for other outside functions which may reside on a grid.

In one embodiment, the individual species stream(s) 514 may include a variety of gases (such as argon, nitrogen, hydrogen, methane, etc.). In another embodiment, the PEM fuel cell 526 may generate electricity using (for example) the hydrogen gas 522 as a fuel and the oxygen gas 524 as an oxidant.

In one embodiment, multi-stage gas separator system 512 may use membranes designed to filter and/or isolate one or more different gas streams. Additionally, the membrane separation process may comprise separating a gas stream input into a retentate (that may ultimately be cycled back through the same or a different membrane and, thus, further separated) and a permeate gas species which may be isolated via a filter membrane. It should be noted that the gas stream input may comprise, but not be limited to, a volume of light PAH material (such as syngas), argon gas, nitrogen gas, hydrogen gas, and/or methane gas. Of course, it is to be appreciated that the multi-stage gas separator system 512 may be configured to separate the components of the inputted effluent stream using other separation techniques (e.g. distillation, etc.).

Figure 6:
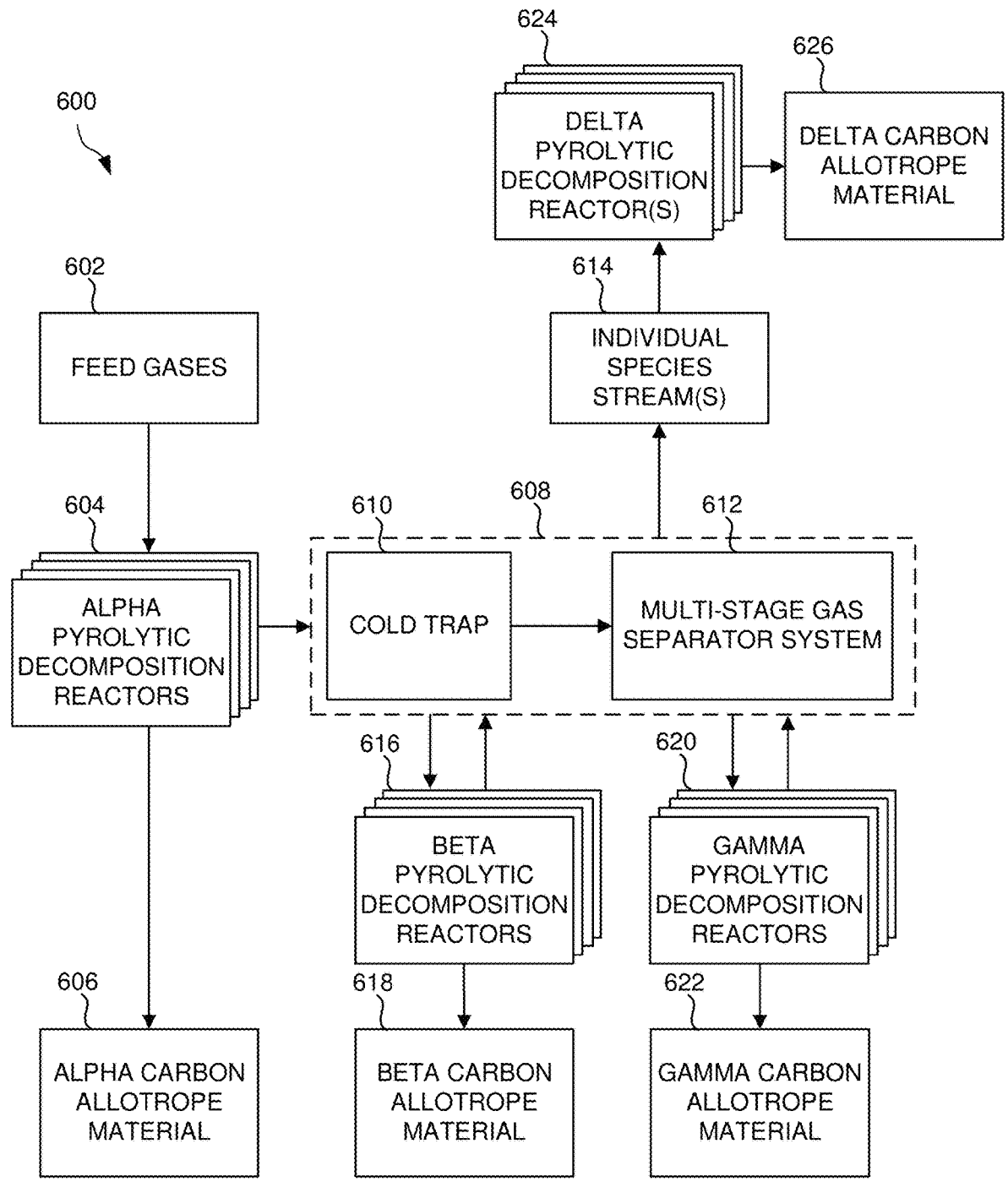
FIG. 6 illustrates a system for producing additional allotrope material using pyrolytic emission looping, in accordance with one embodiment.

FIG. 6 illustrates a system 600 for producing additional allotrope material using pyrolytic emission looping, in accordance with one embodiment. As an option, the system 600 may be implemented in the context of any one or more of the embodiments set forth in any previous and/or subsequent figure(s) and/or description thereof. Of course, however, the system 600 may be implemented in the context of any desired environment. Further, the aforementioned definitions may equally apply to the description below.

As shown, the system 600 may comprise one or more feed gases 602 entering one or more alpha pyrolytic decomposition reactors 604, where the feed gases 602, at least in part, may transmute into an alpha carbon allotrope material 606. Additionally, the system 600 may comprise a gas separating system 608, within which a primary cold trap 610 and multi-stage gas separator system 612 components further process an effluent stream from, for example, the alpha pyrolytic decomposition reactors 604. Further, the gas separation system 608 may be used to pass non-condensable components of the effluent stream to one or more beta pyrolytic decomposition reactors 616, where the non-condensable components may be transmuted into beta carbon allotrope material 618. Further, the system 608 may be used to pass condensable components of the effluent stream to one or more gamma pyrolytic decomposition reactors 620, where the non-condensable components may be transmuted into gamma carbon allotrope material 622.

In one embodiment, waste streams (not consumed components) from the beta pyrolytic decomposition reactors 616 and/or the gamma pyrolytic decomposition reactors 620 may be passed back to the gas separating system 608. The gas separating system 608, in turn, may separate the output stream into individual species stream(s) 614.

Further still, the system 600 may comprise passing the one or more individual species stream(s) 614 to one or more delta pyrolytic decomposition reactor(s) 624, where the individual species stream(s) 614 may be further transmuted into delta carbon allotrope material 626. Within the context of the present description, the delta carbon allotrope material 626 may include CAMs derived from another hydrocarbon source, or from a same source (but at another stage in the serial processing). For example, delta carbon allotrope material 626 may be derived from recycled methane ($CH_4$) that has been refined from one or more other alpha/beta/gamma process exhaust effluents. In this manner, the recycled methane may include left over non-reacted or reformed $CH_4$. The delta Greek designation may denote, in one embodiment, that delta carbon allotrope material 626 is an internally supplied recycled $CH_4$ feed source with respect to the pyrolytic emission looping system. In one embodiment, the delta carbon allotrope material 626 may be the same as the alpha carbon allotrope material 606 (with respect to the same chemical reaction occurring).

In comparing the system 600 to the system 400, it is to be appreciated that rather than feeding the one or more individual species stream(s) 414 back to the feed gases 402, the one or more individual species stream(s) 614 is fed to the delta pyrolytic decomposition reactor(s) 624. It is to be appreciated that the individual species stream(s) 614 may be used in part with the feed gases 602, with the delta pyrolytic decomposition reactor(s) 624, and/or other elements of the system 600 as desired. The present configuration of the system 600 is intended to display that the individual species stream(s) 614 can be further fed to additional reactors (such as the delta pyrolytic decomposition reactor(s) 624) to further create additional material (such as the delta carbon allotrope material 626).

Figure 7:
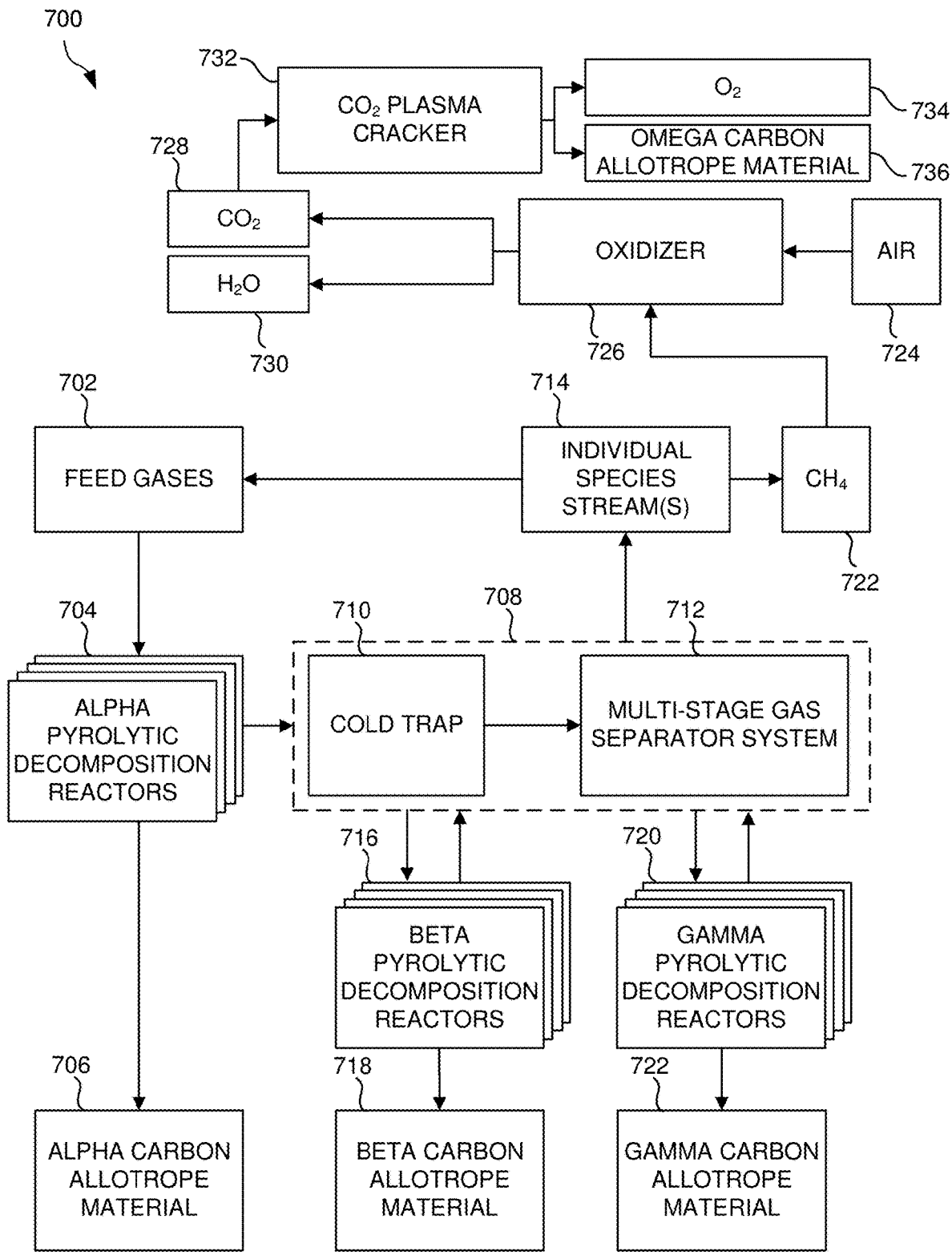
FIG. 7 illustrates a system for hydrocarbon abatement via pyrolytic emission looping, in accordance with one embodiment.

FIG. 7 illustrates a system 700 for hydrocarbon abatement via pyrolytic emission looping, in accordance with one embodiment. As an option, the system 700 may be implemented in the context of any one or more of the embodiments set forth in any previous and/or subsequent figure(s) and/or description thereof. Of course, however, the system 700 may be implemented in the context of any desired environment. Further, the aforementioned definitions may equally apply to the description below.

As shown, the system 700 may comprise one or more feed gases 702 entering one or more alpha pyrolytic decomposition reactors 704, where the feed gases 702, at least in part, may transmute into an alpha carbon allotrope material 706. Additionally, the system 700 may comprise a gas separating system 708, within which a primary cold trap 710 and multi-stage gas separator system 712 components further process an effluent stream from, for example, the alpha pyrolytic decomposition reactors 704. Further, the gas separation system 708 may be used to pass non-condensable components of the effluent stream to one or more beta pyrolytic decomposition reactors 716, where the non-condensable components may be transmuted into beta carbon allotrope material 718. Further, the gas separating system 708 may be used to pass condensable components of the effluent stream to one or more gamma pyrolytic decomposition reactors 720, where the non-condensable components may be transmuted into gamma carbon allotrope material 722.

In one embodiment, waste streams (not consumed components) from the beta pyrolytic decomposition reactors 716 and/or the gamma pyrolytic decomposition reactors 720 may be passed back to the gas separating system 708. The gas separating system 708, in turn, may separate the output stream into individual species stream(s) 714. The individual species stream(s) 714, in turn, may then be fed back, at least in part, to the feed gases 702, and/or used in a species-specific manner (for example, argon as an inert, etc.).

For example, the individual species stream(s) 714 may include methane ($CH_4$) 722, which in turn may be passed to an oxidizer 726 where the methane ($CH_4$) 722 may be combined with air 724 to produce an output of carbon dioxide ($CO_2$) 728 and water ($H_2O$) 730. The resulting carbon dioxide ($CO_2$) 728 may be provided to a carbon dioxide ($CO_2$) plasma cracker 732. The output of the carbon dioxide ($CO_2$) plasma cracker 732 may include an omega carbon allotrope material 736 and oxygen gas 734. In the context of the present description, the omega carbon allotrope material 736 may include CAMs derived from another hydrocarbon source, or from a same source (but at another stage in the serial processing). For example, the omega carbon allotrope material 736 may include carbon materials derived from a $CO_2$ feed source.

In one embodiment, the air 724 component may include pure oxygen gas. It is to be appreciated, additionally, that the configuration and components of the system 700 may build upon the systems disclosed hereinabove (such as the system 400, the system 500, etc.).

Figure 8:
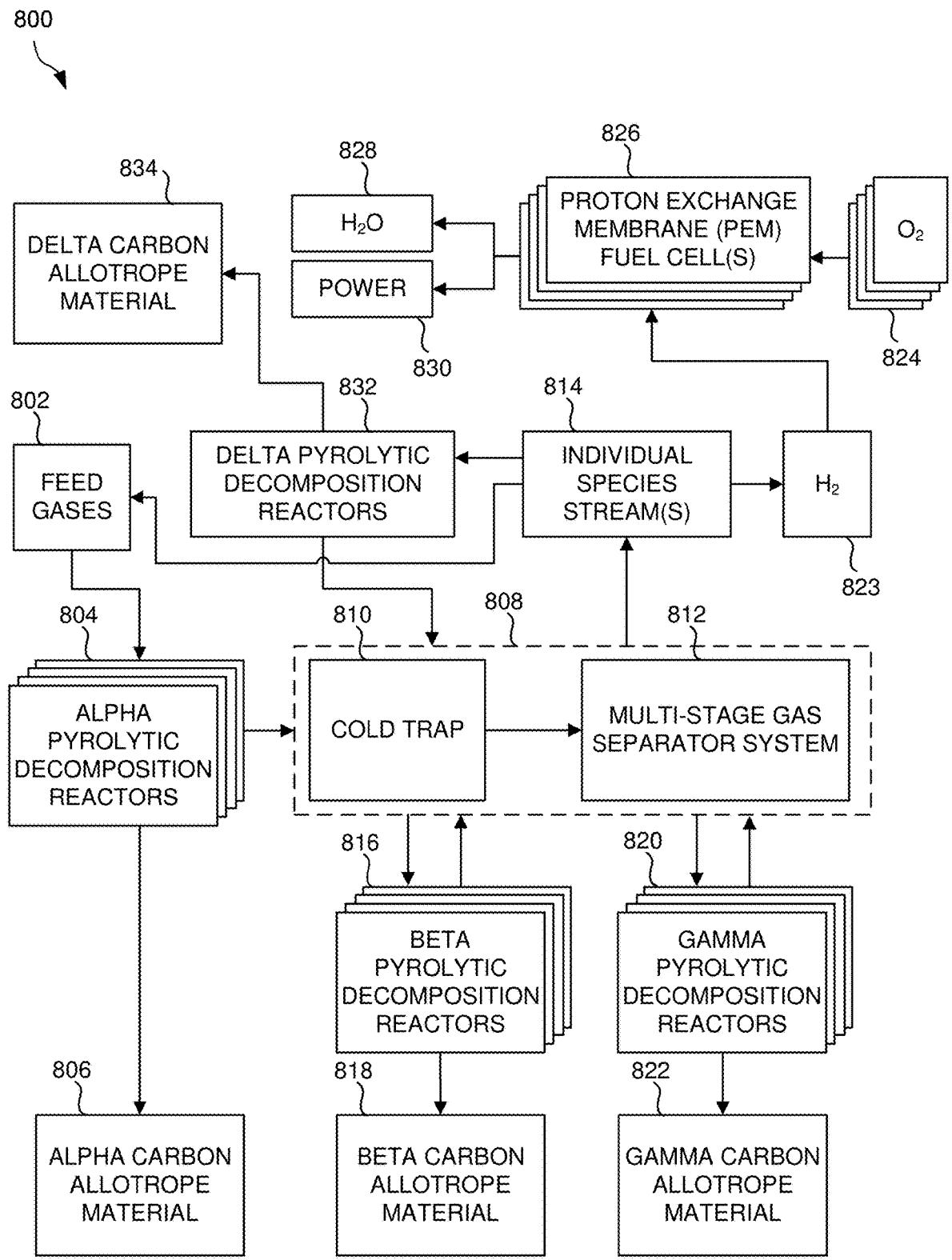
FIG. 8 illustrates a system for hydrocarbon abatement via pyrolytic emission looping, in accordance with one embodiment.

FIG. 8 illustrates a system 800 for hydrocarbon abatement via pyrolytic emission looping, in accordance with one embodiment. As an option, the system 800 may be implemented in the context of any one or more of the embodiments set forth in any previous and/or subsequent figure(s) and/or description thereof. Of course, however, the system 800 may be implemented in the context of any desired environment. Further, the aforementioned definitions may equally apply to the description below.

As shown, the system 800 may comprise one or more feed gases 802 entering one or more alpha pyrolytic decomposition reactors 804, where the feed gases 802, at least in part, may transmute into an alpha carbon allotrope material 806. Additionally, the system 800 may comprise a gas separating system 808, within which a primary cold trap 810 and multi-stage gas separator system 812 components further process an effluent stream from, for example, the alpha pyrolytic decomposition reactors 804. Further, the gas separation system 808 may be used to pass non-condensable components of the effluent stream to one or more beta pyrolytic decomposition reactors 816, where the non-condensable components may be transmuted into beta carbon allotrope material 818. Further, the gas separating system 808 may be used to pass condensable components of the effluent stream to one or more gamma pyrolytic decomposition reactors 820, where the non-condensable components may be transmuted into gamma carbon allotrope material 822.

In one embodiment, waste streams (not consumed components) from the beta pyrolytic decomposition reactors 816 and/or the gamma pyrolytic decomposition reactors 820 may be passed back to the gas separating system 808. The gas separating system 808, in turn, may separate the output stream into individual species stream(s) 814.

Additionally, the system 800 shows how multiple processes and functions can exist in tandem and conjunction. For example, at least a portion of the one or more individual species stream(s) 814 to the feed gases 802, and/or used in a species-specific manner (for example, argon as an inert, etc.). Additionally, at least a portion of the one or more individual species stream(s) 814 may be fed to one or more delta pyrolytic decomposition reactor(s) 832, where the at least a portion of the one or more individual species stream (s) may transmuted into delta carbon allotrope material 834. Even further, at least a portion of the one or more individual species stream(s) 814 may separate out hydrogen gas 823 and provided to one or more PEM fuel cells 826, which in combination with the oxygen gas 824 may output from the one or more PEM fuel cells 826 power 830 and water ($H_2O$) 828.

In this manner, the system 800 shows that components of the individual species stream(s) 814 may be used within the feed gas 802, for further involvement with a pyrolytic decomposition reactor (such as the delta pyrolytic decomposition reactor(s) 832), for further involvement with a power generation (via, e.g., the PEM fuel cell(s) 826), etc. It is envisioned that other systems may use at least a portion of the one or more individual species stream(s) (other reactor systems, other cracking systems, other green power generation, other recycling systems, other turbine power generation systems, etc.). Additionally, the flow and configuration of the system 800 may be further modified based on the needs and industrial requirements of the processing plant.

It should be appreciated that a large benefit of the configuration of the system 800 is to provide a way to continuously recycle the effluent gas stream from pyrolytic processes. Additionally, such effluent gas stream may be separated into species-specific components for reuse or further use, as appropriate, rather than simply allowing the effluent gas stream to be released into the air.

Further, the system 800 (with and/or without components of other systems disclosed herein) may be used to provide green on-demand/available energy resources via specialized manufacturing to a customer base (which is flexible in terms of ramping up production and components). Additionally, power may be generated by such a system such that the system may be configured for near self-sufficiency, and/or the generated electricity may be pushed out to external power stations capable of providing needed power for other outside functions which may reside on a grid.

Figure 9:
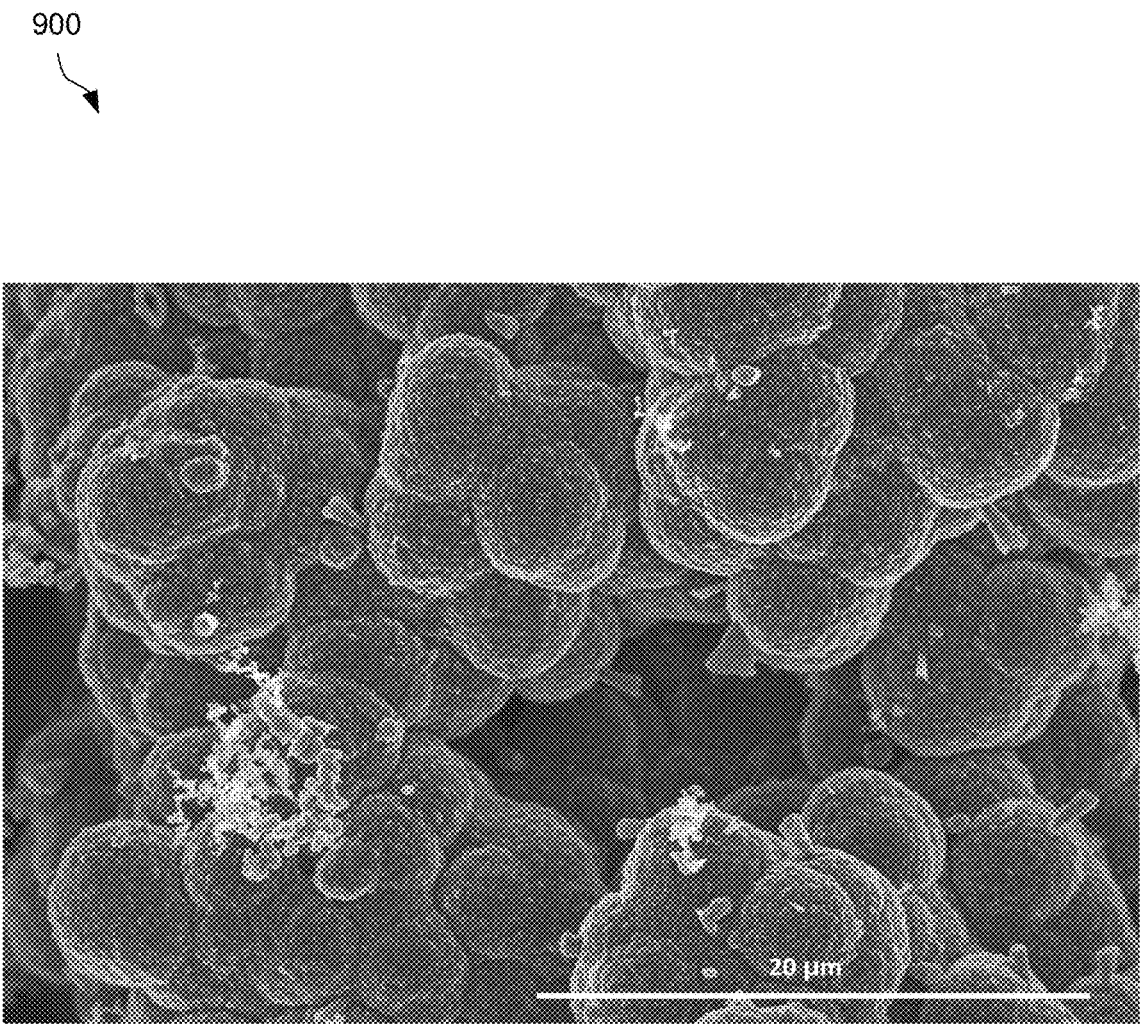
FIG. 9 illustrates an image of a carbon allotrope material, in accordance with one embodiment.

FIG. 9 illustrates an image of a carbon allotrope material 900, in accordance with one embodiment. As an option, the image of the carbon allotrope material 900 may be implemented in the context of any one or more of the embodiments set forth in any previous and/or subsequent figure(s) and/or description thereof. Of course, however, the image of the carbon allotrope material 900 may be implemented in the context of any desired environment. Further, the aforementioned definitions may equally apply to the description below.

As shown, the image of the carbon allotrope material 900 may manifest as carbon based compounds measuring roughly 10 microns in size, resulting from a pyrolysis reactor.

It is to be appreciated that, as disclosed herein, alpha carbon allotrope material, beta carbon allotrope material, and/or gamma carbon allotrope material (and/or any other type of carbon allotrope material) may be created in series and/or in parallel (simultaneously).

Figure 10:
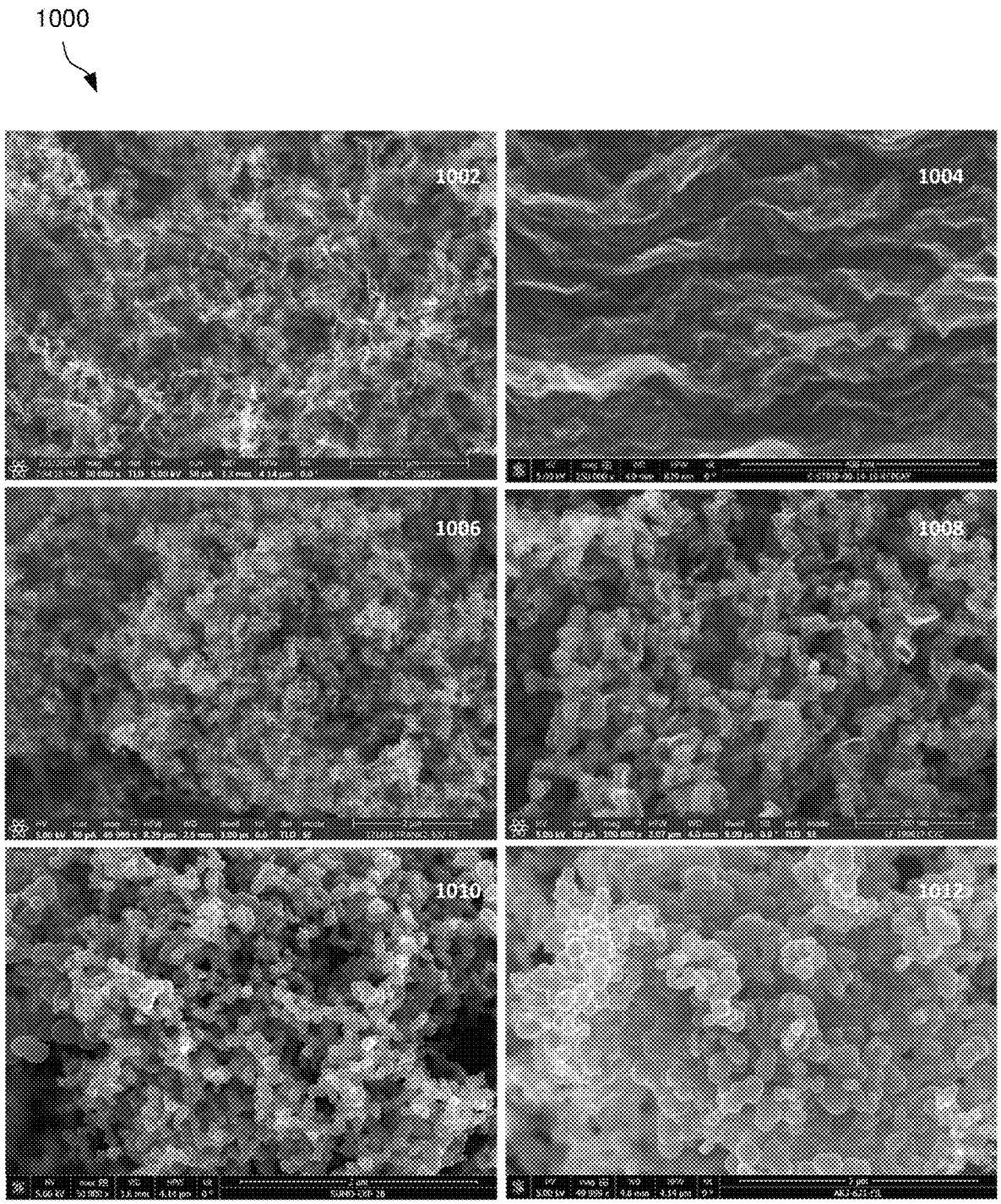
FIG. 10 illustrates images of a carbon allotrope material, in accordance with one embodiment.

FIG. 10 illustrates images of a carbon allotrope material 1000, in accordance with one embodiment. As an option, the images of the carbon allotrope material 1000 may be implemented in the context of any one or more of the embodiments set forth in any previous and/or subsequent figure(s) and/or description thereof. Of course, however, the images of the carbon allotrope material 1000 may be implemented in the context of any desired environment. Further, the aforementioned definitions may equally apply to the description below.

As shown, the images of the carbon allotrope material 1000 include scanning electron microscope (SEM) images 1002-1012 of various carbon allotrope materials. For example, SEM images 1002-1012 illustrate a few of the many types of raw CAM materials that have been produced. Of course, it is to be appreciated that other CAMs may be produced. The SEM images 1002-1012 are not intended to be representative of all CAMs which can be produced, but rather, they are merely some results derived from the pyrolytic emissions looping process.

Figure 11:
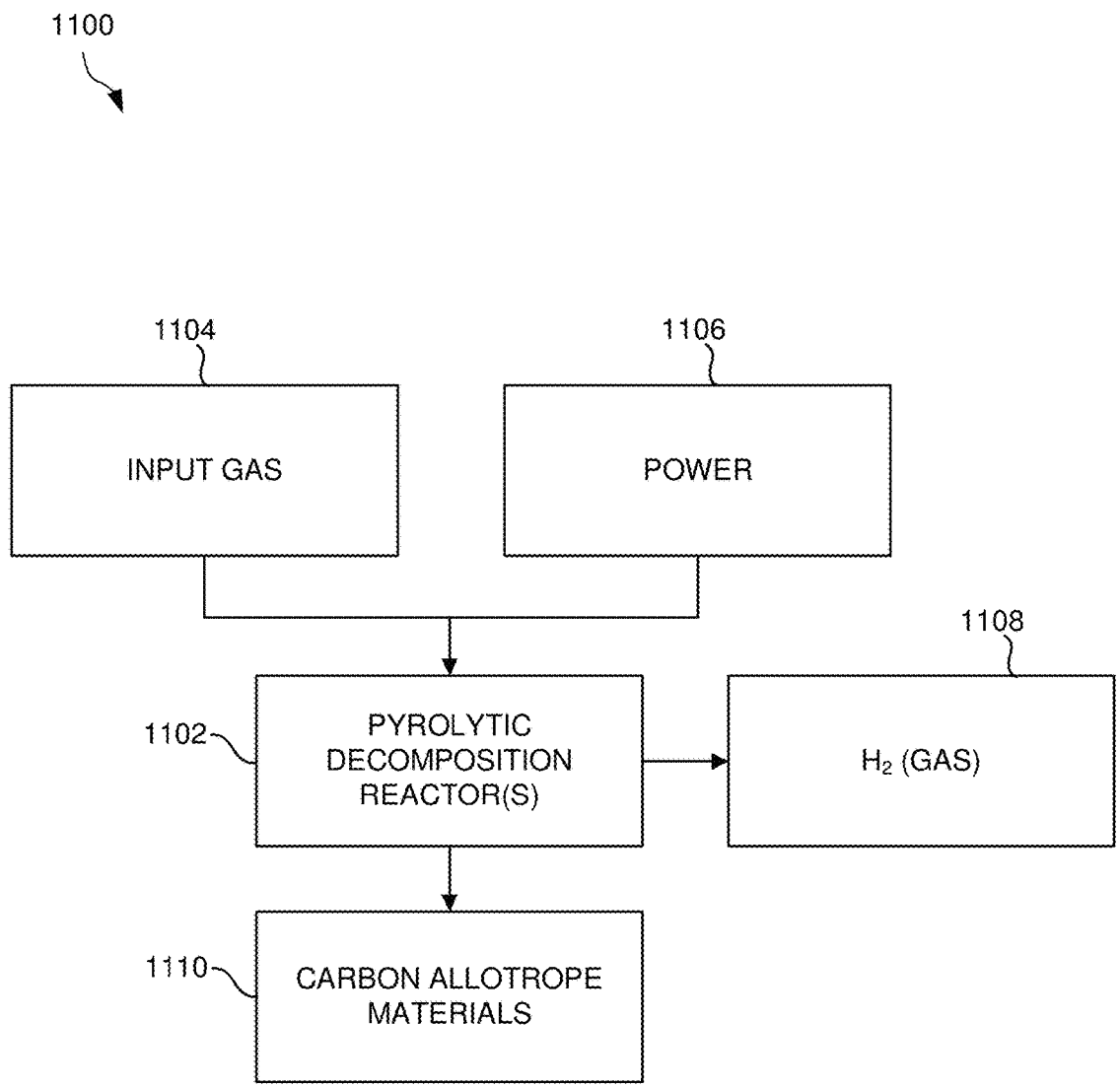
FIG. 11 illustrates a system involving pyrolytic decomposition reactor(s), in accordance with one embodiment.

FIG. 11 illustrates a system 1100 involving pyrolytic decomposition reactor(s), in accordance with one embodiment. As an option, the system 1100 may be implemented in the context of any one or more of the embodiments set forth in any previous and/or subsequent figure(s) and/or description thereof. Of course, however, the system 1100 may be implemented in the context of any desired environment. Further, the aforementioned definitions may equally apply to the description below.

As shown, the system 1100 may comprise injecting and combining input gas 1104 and power 1106 into one or more pyrolytic decomposition reactors 1102 and, following a pyrolytic process, output carbon allotrope materials 1110 and hydrogen gas 1108.

In one embodiment, the input gas 1104 may include compressed natural gas (CNG), syngas, a species-specific stream, a preconfigured configuration, etc. Additionally, the carbon allotrope materials 1110 may be directly associated with the content of the input gas 1104. For example, the carbon allotrope materials 1110 would be expected to differ based on whether the input gas 1104 included non-condensable components, gasified condensable components, etc. Thus, the content of the input gas 1104 may be used to control the resulting carbon allotrope materials 1110 produced. Further, as disclosed herein, there may be multiple pyrolytic decomposition reactor(s) 1102, and the configuration/placement of such may be in combination with other gas separating systems such that the input gas 1104 into each of the pyrolytic decomposition reactor(s) can be controlled.

Figure 12:
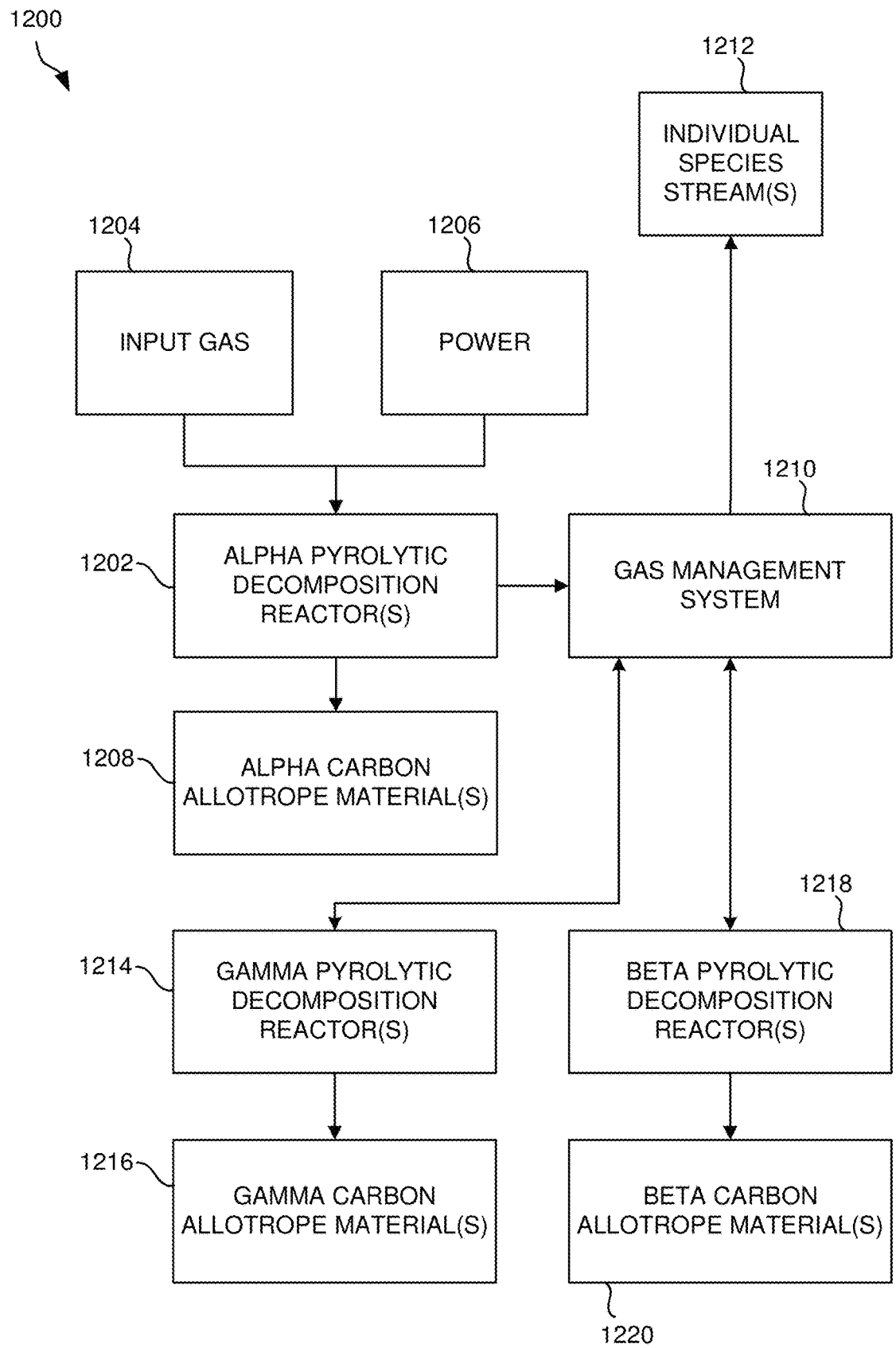
FIG. 12 illustrates a system involving pyrolytic decomposition reactor(s), in accordance with one embodiment.

FIG. 12 illustrates a system 1200 involving pyrolytic decomposition reactor(s), in accordance with one embodiment. As an option, the system 1200 may be implemented in the context of any one or more of the embodiments set forth in any previous and/or subsequent figure(s) and/or description thereof. Of course, however, the system 1200 may be implemented in the context of any desired environment. Further, the aforementioned definitions may equally apply to the description below.

As shown, a system 1200 may comprise injecting and combining input gas 1204 and power 1206 into one or more alpha pyrolytic decomposition reactors 1202 and, following a pyrolytic decomposition process, output alpha carbon allotrope materials 1208 and pass effluent gases to a gas management system 1210.

Additionally, the gas management system 1210 may process the effluent gases stream and output at least a portion of the effluent gases stream to one or more beta pyrolytic decomposition reactors 1218 and gamma pyrolytic decomposition reactors 1214. In addition, the system 1200 may comprise passing output material to one or more beta pyrolytic decomposition reactors 1218, and/or one or more gamma pyrolytic decomposition reactors 1214. In one embodiment, the one or more beta pyrolytic decomposition reactors 1218 may output beta carbon allotrope material(s) 1220 and/or return a waste gas stream to the gas management system 1210 for further processing. Additionally, in one embodiment, the one or more gamma pyrolytic decomposition reactors 1214 may output gamma carbon allotrope material(s) 1216 and/or return a waste gas stream to the gas management system 1210.

In one embodiment, the gas management system 1210 may output individual species stream(s) 1212. Additionally (not shown), the individual species stream(s) may be reused into a pyrolytic decomposition reactor, and/or reused as needed within the system 1200.

Figure 13:
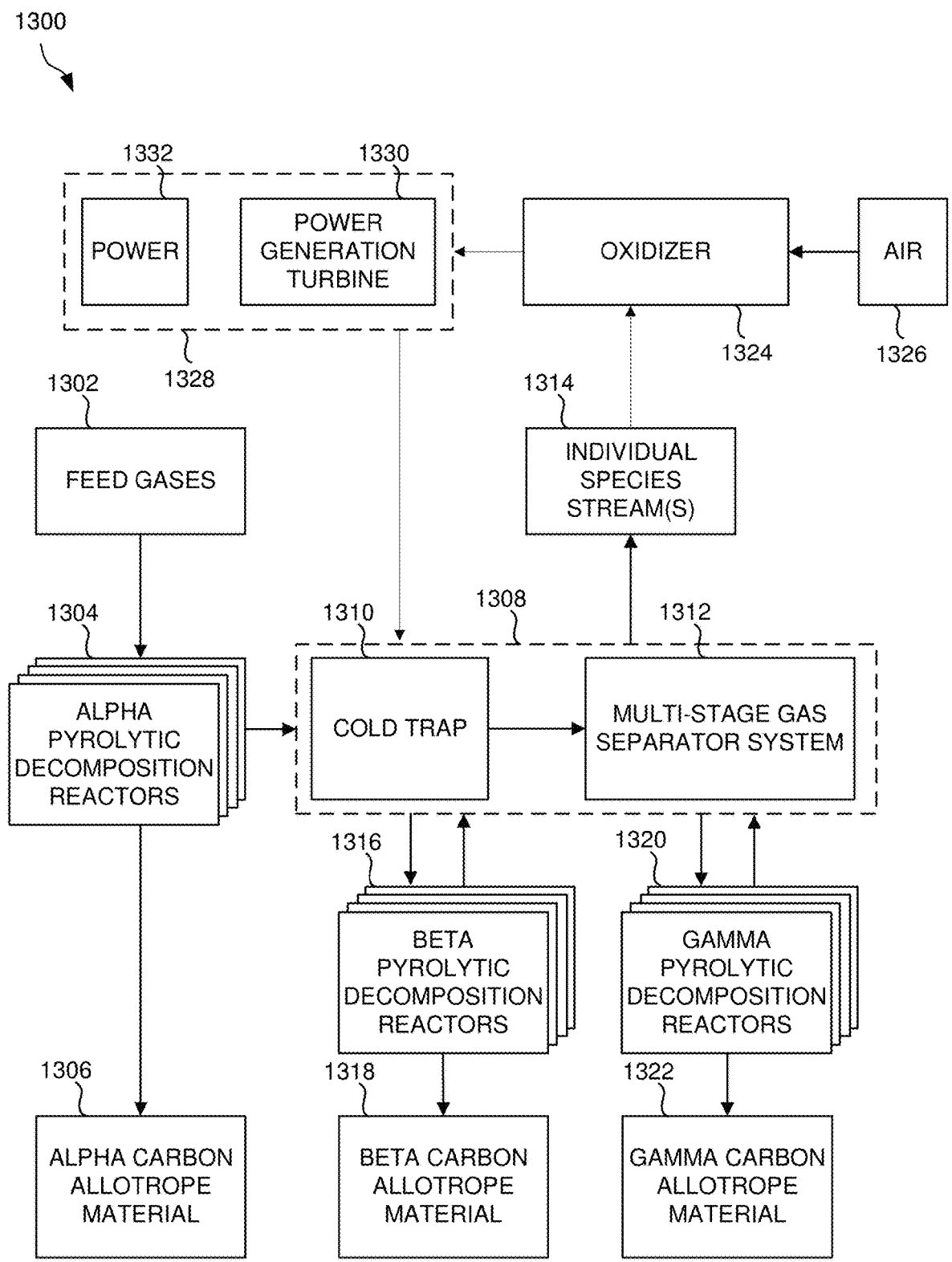
FIG. 13 illustrates a system for power generation using pyrolytic emission looping, in accordance with one embodiment.

FIG. 13 illustrates a system 1300 for power generation using pyrolytic emission looping, in accordance with one embodiment. As an option, the system 1300 may be implemented in the context of any one or more of the embodiments set forth in any previous and/or subsequent figure(s) and/or description thereof. Of course, however, the system 1300 may be implemented in the context of any desired environment. Further, the aforementioned definitions may equally apply to the description below.

As shown, the system 1300 may comprise one or more feed gases 1302 entering one or more alpha pyrolytic decomposition reactors 1304, where the feed gases 1302, at least in part, may transmute into an alpha carbon allotrope material 1306. Additionally, the system 1300 may comprise a gas separating system 1308, within which a primary cold trap 1310 and multi-stage gas separator system 1312 components further process an effluent stream from, for example, the alpha pyrolytic decomposition reactors 1304. Further, the gas separation system 1308 may be used to pass non-condensable components of the effluent stream to one or more beta pyrolytic decomposition reactors 1316, where the non-condensable components may be transmuted into beta carbon allotrope material 1318. Further, the gas separating system 1308 may be used to pass condensable components of the effluent stream to one or more gamma pyrolytic decomposition reactors 1320, where the non-condensable components may be transmuted into gamma carbon allotrope material 1322.

In one embodiment, waste streams (not consumed components) from the beta pyrolytic decomposition reactors 1316 and/or the gamma pyrolytic decomposition reactors 1320 may be passed back to the gas separating system 1308. The gas separating system 1308, in turn, may separate the output stream into individual species stream(s) 1314. The individual species stream(s) 1314, in turn, may then be fed to an oxidizer 1324 and used, at least in part, and in combination with inputted air 1326 (or another source of oxygen gas $O_2$) to output, at least carbon dioxide ($CO_2$). The output may be fed to a power generation system 1328 which may include a power generation turbine 1330 (to generate power) and stored power 1332 (to store power). A waste gas stream from the power generation system 1328 may be fed back to the gas separating system 1308 for further use and/or processing. Additionally (not shown), any of the waste gas streams may be used in combination (or in lieu of) other processes and systems detailed herein (such as other pyrolytic reactors, inert stream recycling, etc.). In this manner, green energy may be generated with no harmful wastes being released into the air.

Figure 14:
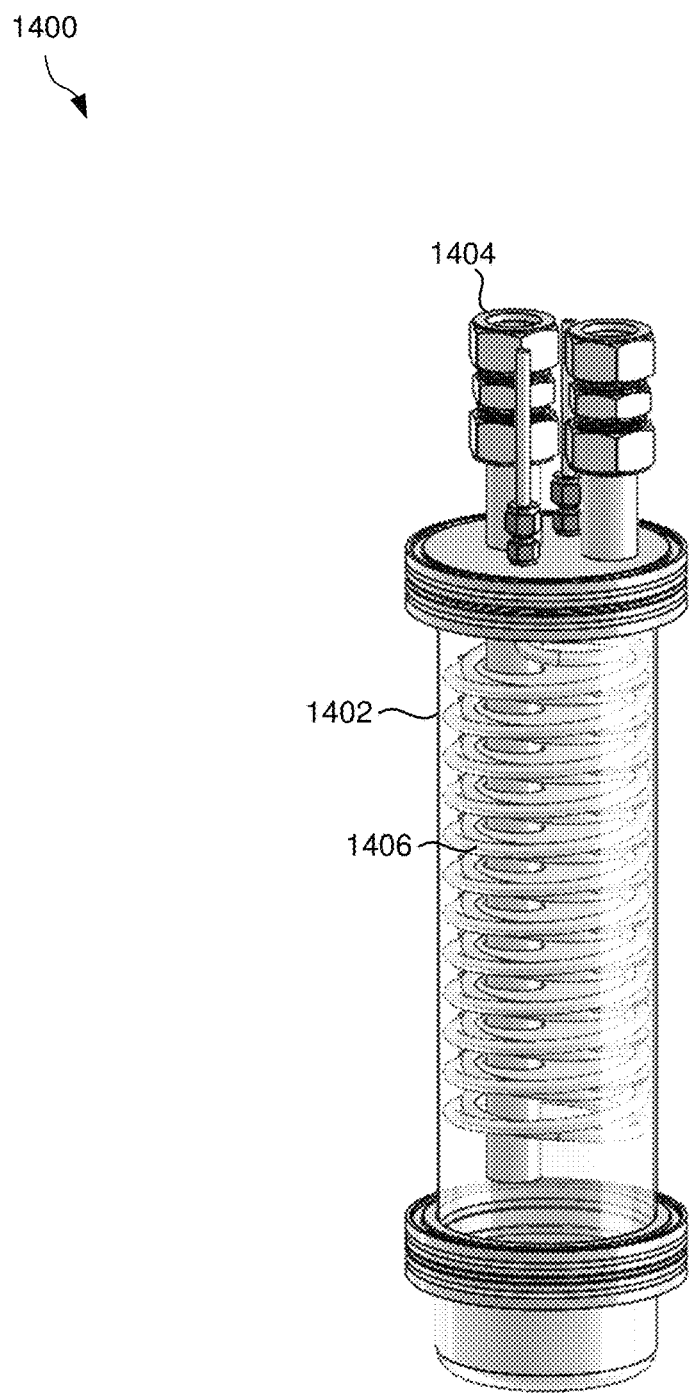
FIG. 14 illustrates a separation apparatus, in accordance with one embodiment.

FIG. 14 illustrates a separation apparatus 1400, in accordance with one embodiment. As an option, the apparatus 1400 may be implemented in the context of any one or more of the embodiments set forth in any previous and/or subsequent figure(s) and/or description thereof. Of course, however, the apparatus 1400 may be implemented in the context of any desired environment. Further, the aforementioned definitions may equally apply to the description below.

As shown, the separation apparatus 1400 may comprise a protective enclosure 1402 around a separation coil 1406 into which various feed gasses may be fed and extracted via input and return housings 1404. In one embodiment, the separation apparatus 1400 may operate in two phases comprising a first phase which entails capturing polycyclic aromatic hydrocarbons (PAH) condensable byproducts, and a second phase which entails in-situ re-gasification of captured PAH. For example, in one embodiment, the separation apparatus 1400 may function as a cold trap. In this mode, the separation apparatus 1400 may accumulate an inlet gas mixture consisting of heavy PAHs, and/or other gases (including but not limited to argon, nitrogen, hydrogen, methane, etc.). The cold trap may allow condensation (particularly of condensable gases). In another embodiment, when the cold trap is full, the separation apparatus 1400 may change modes to a distillation mode such that the condensable liquids may be re-gasified.

In yet another embodiment, heated inert gas may be used to purge annular space in the cold trap to remove residual cooling medium. It should be noted that this may be a vital process to ensure effluent within the annular space is free of cooling medium via gas instrumentation. In a related embodiment, bottom baffles of the cold trap kiln may include drain slits to allow for condensed heavy PAH to accumulate throughout the lower portion of the cold trap. As such, the separation apparatus 1400 may include both heating and cooling capabilities.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A pyrolytic emissions looping system, including:
a feed gas stream;
at least one dissociating reactor that receives the feed gas stream, and that outputs, at least in part, a first carbon allotrope material and a discharge pyrolytic emissions stream resulting from a pyrolytic decomposition;
a gas separating system to separate the discharge pyrolytic emissions stream into at least one species component, wherein the separation includes processing of multiple types of hydrocarbons;
a pyrolytic emissions waste gas stream comprising the at least one species component; and
at least one second dissociating reactor that receives at least a portion of the pyrolytic emissions waste gas stream, wherein:
the at least one second dissociating reactor is a furnace reactor;
the at least one second dissociating reactor is configured to dissociate hydrocarbons and form a second carbon allotrope material different from the first carbon allotrope material; and
at least one of:
the at least one second dissociating reactor comprises a furnace reactor configured to transmute non-condensable components of the pyrolytic emissions waste gas stream into the second carbon allotrope material, or
the first carbon allotrope material comprises primary hydrocarbons derived from methane or compressed natural gas, and the second carbon allotrope material comprises secondary hydrocarbons derived from non- condensable polycyclic aromatic hydrocarbons.

2. The pyrolytic emissions looping system of claim 1, wherein the discharge pyrolytic emissions stream includes molecularly decomposed hydrocarbons.

3. The pyrolytic emissions looping system of claim 1, wherein the discharge pyrolytic emissions stream includes emission byproducts from a pyrolytic process.

4. The pyrolytic emissions looping system of claim 1, wherein the at least one species component is further added to the feed gas stream.

5. The pyrolytic emissions looping system of claim 1, wherein the pyrolytic emissions include a thermal decomposition, and the thermal decomposition includes a decomposition of at least one hydrocarbon.

6. The pyrolytic emissions looping system of claim 1, wherein the gas stream includes one or more polycyclic aromatic hydrocarbons, comprising at least one of: 1,3-Butadiene; 2,2,4-Trimethylpentane; 2-Propanol (IPA); 2-methylpentane; 4H-Cyclopenta[def]phenanthrene; Acetone; Acetylene; Acrylonitrile; Allylchloride; Benzene; Benzo[c]phenanthrene; Benzo[e]pyrene; Benzo[ghi]perylene; Benzo[ghi]perylene, 4-methyl-; Benzo[k]fluoranthene; Bicyclo[4.4.1]undeca-1,3,5,7,9-pentaene; Butadiene; Butane; Butenes; C4H10; C5H12; C6H14; Chlorobenzene; Coronene; Coronene, methyl-; Ethane; Ethylbenzene; Ethylene; Fluorene; HCN; Hexane +; Indeno[1,2,3-cd]pyrene; Isobutane; Isopentane; Isopropyl benzene; Isopropylbenzene; MEK; Methane; Methanol; Methylcyclohexane; Naphthalene; Naphthalene, 2-methyl-; Pentane; Phenanthrene; Propane; Propene; Propylene; Pyrene; Pyrene, 1-methyl-; Styrene; Toluene; m & p Xylene; n-butane; n-hexane; n-pentane; o,m&p-Xylenes; or o-Xylene.

7. The pyrolytic emissions looping system of claim 5, wherein the thermal decomposition occurs in the absence of oxygen.

8. The pyrolytic emissions looping system of claim 1, wherein the at least one species component includes at least one of Ar, $N_2$, $H_2$, $CH_4$, $O_2$, $CO_2$, or one or more polycyclic aromatic hydrocarbons, comprising at least one of: 1,3-Butadiene; 2,2,4-Trimethylpentane; 2-Propanol (IPA); 2-methylpentane; 4H-Cyclopenta[def]phenanthrene; Acetone; Acetylene; Acrylonitrile; Allylchloride; Benzene; Benzo[c]phenanthrene; Benzo[e]pyrene; Benzo[ghi]perylene; Benzo[ghi]perylene, 4-methyl-; Benzo[k]fluoranthene; Bicyclo[4.4.1]undeca-1,3,5,7,9-pentaene; Butadiene; Butane; Butenes; C4H10; C5H12; C6H14; Chlorobenzene; Coronene; Coronene, methyl-; Ethane; Ethylbenzene; Ethylene; Fluorene; HCN; Hexane +; Indeno[1,2,3-cd]pyrene; Isobutane; Isopentane; Isopropyl benzene; Isopropylbenzene; MEK; Methane; Methanol; Methylcyclohexane; Naphthalene; Naphthalene, 2-methyl-; Pentane; Phenanthrene; Propane; Propene; Propylene; Pyrene; Pyrene, 1-methyl-; Styrene; Toluene; m & p Xylene; n-butane; n-hexane; n-pentane; o,m&p-Xylenes; or o-Xylene.

9. The pyrolytic emissions looping system of claim 8, wherein at least a portion of the at least one species component is an input stream to at least one of:
a proton exchange membrane fuel cell,
the at least one dissociating reactor;
the at least one second dissociating reactor;
a third dissociating reactor,
a power generation turbine,
a catalytic converter,
an oxidizer, or
a $CO_2$ cracker.

10. The pyrolytic emissions looping system of claim 1, wherein the at least one dissociating reactor is configured to dissociate hydrocarbons.

11. The pyrolytic emissions looping system of claim 10, wherein the at least one dissociating reactor is configured to dissociate the hydrocarbons and form at least the first carbon allotrope material.

12. The pyrolytic emissions looping system of claim 11, wherein the gas separating system includes a cold trap and a multi-stage gas separator.

13. The pyrolytic emissions looping system of claim 11, further comprising at least one third dissociating reactor that receives an output of the gas separating system, wherein the at least one third dissociating reactor is configured to dissociate the hydrocarbons and form at least a third carbon allotrope material different from each of the first carbon allotrope material and the second carbon allotrope material.

14. The pyrolytic emissions looping system of claim 1, wherein the pyrolytic emissions looping system is configured for a hydrocarbon site, wherein the hydrocarbon site includes at least one of oil field, gas field, oil sand, oil shale deposit, coal deposit, offshore oil reserve, offshore gas reserve, shale gas deposit, methane hydrates, oil seep, or gas seep.

15. The pyrolytic emissions looping system of claim 1, wherein the at least one dissociating reactor is configured for a remote hydrocarbon site, and at least one of the following provisos are satisfied:

wherein the separation into at least one species component at the remote hydrocarbon site is configured for hydrocarbon reduction, wherein the separation into at least one species component at the remote hydrocarbon site is configured for hydrocarbon abatement, or wherein the separation into at least one species component reduces discharge of greenhouse gases.

16. The pyrolytic emissions looping system of claim 1, wherein at least one of the at least one dissociating reactor or the at least one second dissociating reactor includes a thermal reactor.

17. The pyrolytic emissions looping system of claim 1, wherein at least one of the at least one dissociating reactor or the at least one second dissociating reactor includes a microwave reactor.

18. The pyrolytic emissions looping system of claim 1, wherein all of the at least one species component is reused by the pyrolytic emissions looping system.

19. The pyrolytic emissions looping system of claim 1, wherein at least one of the at least one species component is reused by the pyrolytic emissions looping system.

20. The pyrolytic emissions looping system of claim 1, wherein the furnace reactor is one of a plasma reactor, a pulsed reactor, or a microwave reactor.

21. The pyrolytic emissions looping system of claim 1, wherein the first carbon allotrope material includes primary hydrocarbons and the second carbon allotrope material includes secondary hydrocarbons.

22. The pyrolytic emissions looping system of claim 1, wherein the pyrolytic decomposition produces gaseous compounds.

23. The pyrolytic emissions looping system of claim 1, wherein the at least one second dissociating reactor is configured to transmute non-condensable components of at least the pyrolytic emissions waste gas stream into the second carbon allotrope material.

24. The pyrolytic emissions looping system of claim 1, wherein the first carbon allotrope material is derived from at least one of methane or compressed natural gas.

25. The pyrolytic emissions looping system of claim 1, wherein the second carbon allotrope material is derived from non-condensable polycyclic aromatic hydrocarbons (PAHs).

26. The pyrolytic emissions looping system of claim 1, wherein:

the first carbon allotrope material comprises at least one of carbon nano-onions (CNOs), thermal graphene (TG), or microwave graphene (MWG); and the first carbon allotrope material is produced by thermal decomposition at temperatures in excess of 500° F. in the absence of oxygen.

27. The pyrolytic emissions looping system of claim 1, wherein the gas separating system is configured to separate methane from the discharge pyrolytic emissions stream, and the separated methane is used to generate energy via a gas turbine.

28. The pyrolytic emissions looping system of claim 1, wherein:

the pyrolytic decomposition comprises thermal decomposition using thermal energy to release gaseous compounds and particulate compounds; and the furnace reactor comprises a microwave furnace reactor configured to pyrolyze materials to form syngas.

29. The pyrolytic emissions looping system of claim 1, wherein the system is configured for operation at a remote hydrate site, wherein the system uses natural gas to generate electricity.

* * * * *